(12) United States Patent
Wittenmark et al.

(10) Patent No.: US 10,064,174 B2
(45) Date of Patent: Aug. 28, 2018

(54) DISCOVERY SIGNAL MEASUREMENT TIMING CONFIGURATION FOR SCELLS IN ASYNCHRONOUS NETWORKS

(71) Applicant: TELEFONAKTIEBOLAGET LM ERICSSON (PUBL), Stockholm (SE)

(72) Inventors: Emma Wittenmark, Lund (SE); Peter Alriksson, Hörby (SE); David Sugirtharaj, Lund (SE); Mai-Anh Phan, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/429,970

(22) Filed: Feb. 10, 2017

(65) Prior Publication Data
US 2017/0359817 A1 Dec. 14, 2017

Related U.S. Application Data

(63) Continuation of application No. PCT/IB2016/057062, filed on Nov. 23, 2016.
(Continued)

(51) Int. Cl.
*H04W 72/04* (2009.01)
*H04W 76/04* (2009.01)
*H04W 76/27* (2018.01)

(52) U.S. Cl.
CPC ... *H04W 72/0426* (2013.01); *H04W 72/0453* (2013.01); *H04W 76/046* (2013.01); *H04W 76/27* (2018.02)

(58) Field of Classification Search
None
See application file for complete search history.

(56) References Cited

U.S. PATENT DOCUMENTS 8,593,990 B1* 11/2013 Henttonen ........ H04W 36/0094
370/252
9,794,811 B2* 10/2017 Lim ..................... H04W 24/08
(Continued)

FOREIGN PATENT DOCUMENTS

WO 2016/022064 A2 2/2016
WO 2016/071176 A1 5/2016

OTHER PUBLICATIONS

Ericsson: "RRM Procedures with DRS," 3GPP draft; R1-143319, 3rd Generation Partnership Project; RAN WG1, Dresden, Germany; Aug. 17, 2014.
(Continued)

*Primary Examiner* — Steve R Young
(74) *Attorney, Agent, or Firm* — Withrow & Terranova, PLLC

(57) ABSTRACT

Systems and methods relating to Discovery Signal Measurement Timing Configuration (DMTC) are disclosed. In some embodiments, a method of operation of a radio access node in a cellular communications network comprises sending, to a wireless device, a DMTC for one of a group consisting of: (a) a Secondary Cell (SCell) configured for the wireless device such that the DMTC is a specific DMTC for the SCell and (b) a frequency on which one or more asynchronous cells are operating, an asynchronous cell being a cell that is unsynchronized with a Primary Cell (PCell) of the wireless device. A DMTC configuration that is specific to a SCell provides improved measurement performance on the SCell because, e.g., the DMTC configuration can be specifically tailored to that SCell. A DMTC configuration for a frequency on which one or more asynchronous cells are operating provides improved measurement performance on that carrier.

18 Claims, 13 Drawing Sheets

Related U.S. Application Data

(60) Provisional application No. 62/347,543, filed on Jun. 8, 2016.

(56) References Cited

U.S. PATENT DOCUMENTS

| | | | |
|---|---|---|---|
| 2015/0264592 A1* | 9/2015 | Novlan | H04L 27/2601 370/252 |
| 2016/0227571 A1* | 8/2016 | Baek | H04W 16/14 |
| 2016/0262000 A1* | 9/2016 | Koorapaty | H04W 48/12 |
| 2016/0338118 A1* | 11/2016 | Vajapeyam | H04B 17/318 |
| 2017/0105112 A1* | 4/2017 | Park | H04W 8/005 |
| 2018/0069660 A1* | 3/2018 | Yi | H04L 1/0067 |

OTHER PUBLICATIONS

QUALCOMM Incorporation: "Considerations on RRM measurements for LAA-LTE," 3GPP draft; R2-152708 LAA RRM; 3rd Generation Partnership Project; RAN WG2; Fukuoka, Japan; May 24, 2015.
Author Unknown, "Technical Specification Group Radio Access Network; Evolved Universal Terrestrial Radio Access (E-UTRA); Requirements for support of radio resource management (Release 13)," Technical Specification 36.133, Version 13.3.0, 3GPP Organizational Partners, Mar. 2016, 1,581 pages.
Author Unknown, "Technical Specification Group Radio Access Network; Evolved Universal Terrestrial Radio Access (E-UTRA); Physical channels and modulation (Release 11)," Technical Specification 36.211, Version 11.4.0, 3GPP Organizational Partners, Sep. 2013, 120 pages.
Author Unknown, "Technical Specification Group Radio Access Network; Evolved Universal Terrestrial Radio Access (E-UTRA); Physical layer procedures (Release 11)," Technical Specification 36.213, Version 11.4.0, 3GPP Organizational Partners, Sep. 2013, 182 pages.
Author Unknown, "Technical Specification Group Radio Access Network; Evolved Universal Terrestrial Radio Access (E-UTRA); Physical layer; Measurements (Release 13)," Technical Specification 36.214, Version 13.1.0, 3GPP Organizational Partners, Mar. 2016, 18 pages.
Author Unknown, "Technical Specification Group Radio Access Network; Evolved Universal Terrestrial Radio Access (E-UTRA) Radio Resource Control (RRC); Protocol Specification (Release 8)," Technical Specification 36.331, Version 1.0.0, 3GPP Organizational Partners, Nov. 2007, 58 pages.
Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.5.0, 3GPP Organizational Partners, Sep. 2013, 347 pages.
Ericsson, "mf2016.332: DMTC—Phase1," MFA#5, Jun. 14-17, 2016, 7 pages, Beijing, China.
MFA Radio, "xx-xxxx: Signaling for DMTC," MFA RAN WG, Change Request x, 36331, Version 13.1.0, Jun. 14-17, 2016, Beijing, China.

* cited by examiner

DISCOVERY SIGNAL MEASUREMENT TIMING CONFIGURATION FOR SCELLS IN ASYNCHRONOUS NETWORKS

RELATED APPLICATIONS

This application is a continuation of International Application No. PCT/IB2016/057062, filed Nov. 23, 2016, which designated the United States, and which claims the benefit of provisional patent application Ser. No. 62/347,543, filed Jun. 8, 2016, the disclosures of which are incorporated herein by reference in their entirety.

TECHNICAL FIELD

The disclosed subject matter relates generally to telecommunications and more particularly to Discovery Signal Measurement Timing Configuration (DMTC) for Secondary Cells (SCells) in asynchronous networks.

BACKGROUND

The Third Generation Partnership Project (3GPP) initiative "License Assisted Access" (LAA) intends to allow Long Term Evolution (LTE) equipment to also operate in the unlicensed radio spectrum such as the 5 Gigahertz (GHz) band. The unlicensed spectrum is used as a complement to the licensed spectrum. Accordingly, devices connect in the licensed spectrum to a Primary Cell (PCell) and use Carrier Aggregation (CA) to benefit from additional transmission capacity in the unlicensed spectrum by connecting to one or more Secondary Cells (SCells) operating in the unlicensed spectrum. To reduce the changes required for aggregating licensed and unlicensed spectrum, the LTE frame timing in the PCell is simultaneously used in the SCell(s) (i.e., the PCell and the SCells are synchronized). In addition to LAA operation, it should be possible to run LTE fully on the unlicensed band without the support from the licensed band. This is referred to as LTE in the Unlicensed Band (LTE-U) Standalone or MulteFire.

Regulatory requirements, however, may not permit transmissions in the unlicensed spectrum without prior channel sensing. Because the unlicensed spectrum must be shared with other radios of similar or dissimilar wireless technologies, a so called Listen-Before-Talk (LBT) scheme needs to be applied. LBT is also referred to as a Clear Channel Assessment (CCA). Today, the unlicensed 5 GHz spectrum is mainly used by equipment implementing the IEEE 802.11 Wireless Local Area Network (WLAN) standard. This standard is known under its marketing brand "Wi-Fi."

The LBT procedure leads to uncertainty at the enhanced or evolved Node B (eNB) regarding whether or not the eNB will be able to transmit a downlink subframe(s). This leads to a corresponding uncertainty at the User Equipment device (UE) as to whether or not the UE actually has a subframe to decode. An analogous uncertainty exists in the uplink direction where the eNB is uncertain as to whether or not the UEs scheduled on the SCell are actually transmitted.

1 LTE

LTE uses Orthogonal Frequency Division Multiplexing (OFDM) in the downlink and Discrete Fourier Transform (DFT)-spread OFDM (also referred to as single-carrier Frequency Division Multiple Access (FDMA)) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink, and the same number of Single Carrier FDMA (SC-FDMA) symbols in the time domain as OFDM symbols in the downlink.

In the time domain, LTE downlink transmissions are organized into 10 millisecond (ms) radio frames, where each radio frame consists of ten equally-sized subframes of length $T_{subframe}=1$ ms as shown in FIG. 2. For normal cyclic prefix, one subframe consists of 14 OFDM symbols. The duration of each symbol is approximately 71.4 microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in the time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Release (Rel) 11 onwards, the above described resource assignments can also be scheduled on the enhanced Physical Downlink Control Channel (ePDCCH). For Rel-8 to Rel-10, only Physical Downlink Control Channel (PDCCH) is available.

The reference symbols shown in FIG. 3 are the Cell-Specific Reference Symbols (CRSs). The CRSs are used to support multiple functions including fine time and frequency synchronization and channel estimation for certain transmission modes.

1.1 PDCCH and ePDCCH

The PDCCH/ePDCCH is used to carry Downlink Control Information (DCI) such as scheduling decisions and power control commands. More specifically, the DCI includes the following:

Downlink scheduling assignments, including Physical Downlink Shared Channel (PDSCH) resource indication, transport format, Hybrid Automatic Repeat Request (HARQ) information, and control information related to spatial multiplexing (if applicable). A downlink scheduling assignment also includes a command for power control of the Physical Uplink Control Channel (PUCCH) used for transmission of HARQ acknowledgements in response to downlink scheduling assignments.

Uplink scheduling grants, including Physical Uplink Shared Channel (PUSCH) resource indication, transport format, and HARQ-related information. An uplink scheduling grant also includes a command for power control of the PUSCH.

Power control commands for a set of terminals as a complement to the commands included in the scheduling assignments/grants.

One PDCCH/ePDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/ePDCCH resources, and consequently there are typically multiple simultaneous PDCCH/ePDCCH transmissions within each subframe in each cell. Furthermore, to support different radio channel conditions, link adaptation can be used, where the code rate of the PDCCH/ePDCCH is selected by adapting the resource usage for the PDCCH/ePDCCH to match the radio channel conditions.

A discussion of the start symbol for PDSCH and ePDCCH within the subframe is now provided. The OFDM symbols in the first slot are numbered from 0 to 6. For transmissions modes 1-9, the starting OFDM symbol in the first slot of the subframe for ePDCCH can be configured by higher layer signaling and the same is used for the corresponding scheduled PDSCH. Both sets have the same ePDCCH starting symbol for these transmission modes. If not configured by higher layers, the start symbol for both PDSCH and ePDCCH is given by the CFI value signaled in Physical Control Format Indicator Channel (PCFICH).

Multiple OFDM starting symbol candidates can be achieved by configuring the UE in transmission mode 10 and having multiple ePDCCH physical resource block configuration sets. The starting OFDM symbol in the first slot in a subframe for ePDCCH can be configured independently for each ePDCCH set by higher layers to be a value from {1,2,3,4}. If a set is not higher layer configured to have a fixed start symbol, then the ePDCCH start symbol for this set follows the CFI value received in PCFICH.

1.2 CA

The LTE Rel-10 standard supports bandwidths larger than 20 Megahertz (MHz). One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular, for early LTE Rel-10 deployments, it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. One way to obtain this would be by means of CA. CA implies that an LTE Rel-10 terminal can receive multiple CCs, where the CCs have, or at least have the possibility to have, the same structure as an LTE Rel-8 carrier. CA is illustrated in FIG. 4. A CA-capable UE is assigned a PCell that is always activated, and one or more SCells that may be activated or deactivated dynamically.

The number of aggregated CCs as well as the bandwidth of the individual CCs may be different for uplink and downlink. A symmetric configuration refers to the case where the number of CCs in downlink is the same as the number of CCs in the uplink whereas an asymmetric configuration refers to the case where the number of CCs in the downlink is different than the number of CCs in the uplink. It is important to note that the number of CCs configured in a cell may be different from the number of CCs seen by a terminal. A terminal may, for example, support more downlink CCs than uplink CCs, even though the cell is configured with the same number of uplink and downlink CCs.

In addition, a key feature of CA is the ability to perform cross-carrier scheduling. This mechanism allows a (e)PDCCH on one CC to schedule data transmissions on another CC by means of a 3-bit Carrier Indicator Field (CIF) inserted at the beginning of the (e)PDCCH messages. For data transmissions on a given CC, a UE expects to receive scheduling messages on the (e)PDCCH on just one CC—either the same CC or a different CC via cross-carrier scheduling. This mapping from (e)PDCCH to PDSCH is configured semi-statically.

1.3 LTE Measurements

The UE performs periodic cell search and Reference Signal Received Power (RSRP) and Reference Signal Received Quality (RSRQ) measurements in Radio Resource Control (RRC) Connected mode. The UE is responsible for detecting new neighbor cells, and for tracking and monitoring already detected cells. The detected cells and the associated measurement values are reported to the network. Reports to the network can be configured to be periodic or aperiodic based a particular event.

1.4 Rel-12 LTE Discovery Reference Signal (DRS)

To share the channel in the unlicensed spectrum, the cell cannot occupy the channel indefinitely. One of the existing mechanisms for interference avoidance and coordination among small cells is the SCell ON/OFF feature. In Rel-12 LTE, discovery signals were introduced to provide enhanced support for SCell ON/OFF operations. Specifically, these signals were introduced to handle potentially severe interference situations, particularly on the synchronization signals, resulting from dense deployment as well as to reduce UE inter-frequency measurement complexity.

The discovery signals in a DRS occasion are comprised of the Primary Synchronization Signal (PSS), the Secondary Synchronization Signal (SSS), CRS, and, when configured, the Channel State Information Reference Signals (CSI-RS). The PSS and SSS are used for coarse synchronization, when needed, and for cell identification. The CRS is used for fine time and frequency estimation and tracking and may also be used for cell validation, i.e., to confirm the cell Identity (ID) detected from the PSS and SSS. The CSI-RS is another signal that can be used in dense deployments for cell or transmission point identification. FIG. 5 shows the presence of these signals in a DRS occasion of length equal to two subframes and also shows the transmission of the signals over two different cells or transmission points.

The DRS occasion corresponding to transmissions from a particular cell may range in duration from one to five subframes for Frequency Division Duplexing (FDD) and two to five subframes for Time Division Duplexing (TDD). The subframe in which the SSS occurs marks the starting subframe of the DRS occasion. This subframe is either subframe 0 or subframe 5 in both FDD and TDD. In TDD, the PSS appears in subframe 1 and subframe 6 while in FDD the PSS appears in the same subframe as the SSS. The CRSs are transmitted in all downlink subframes and the Downlink Part of the Special Subframe (DwPTS) regions of special subframes.

The discovery signals should be useable by the UE for performing cell identification as well as RSRP and RSRQ measurements. The RSRP measurement definition based on discovery signals is the same as in prior releases of LTE. The Received Signal Strength Indicator (RSSI) measurement is defined as an average over all OFDM symbols in the downlink parts of the measured subframes within a DRS occasion. The RSRQ is then defined as DRSRQ=N× DRSRP/DRSSI, where N is the number of physical resource blocks used in performing the measurement, DRSRP is the RSRP measurement based on the discovery signals, and DRSSI is the RSSI measured over the DRS occasion.

In LTE Rel-12, RSRP measurements based on the CRS and CSI-RS in the DRS occasions and RSRQ measurements based on the CRS in the DRS occasions have been defined. As stated earlier, discovery signals can be used in a small cell deployment where the cells are being turned off and on or in a general deployment where the on/off feature is not being used. For instance, discovery signals could be used to make RSRP measurements on different CSI-RS configurations in the DRS occasion being used within a cell, which enables the detection of different transmission points in a shared cell.

When measurements are made on the CSI-RS in a DRS occasion, the UE restricts its measurements to a list of candidates sent to the UE by the network via RRC signaling. Each candidate in this list contains a Physical Cell Identity (PCID), a Virtual Cell Identity (VCID), and a subframe offset indicating the duration, in number of subframes, between the subframe where the UE receives the CSI-RS and the subframe carrying the SSS. This information allows the UE to limit its search. The UE correlates to the received signal candidates indicated by the RRC signal and reports back any CSI-RS RSRP values that have been found to meet some reporting criterion, e.g., exceeding a threshold value.

When a UE is being served on multiple carrier frequencies via a PCell and one or more SCells, the UE needs to perform Radio Resource Management (RRM) measurements on other cells on the currently used carrier frequencies (i.e., intra-frequency measurements) as well as on cells on other carrier frequencies (i.e., inter-frequency measurements). Because the discovery signals are not transmitted continuously, the UE needs to be informed about the timing of the discovery signals so as to manage its search complexity. Furthermore, when a UE is being served on as many carrier frequencies as it is capable of supporting and inter-frequency RRM measurements need to be performed on a different carrier frequency that is not currently being used, the UE is assigned a measurement gap pattern. This gap pattern on a serving frequency allows the UE to retune its receiver for the serving frequency to the other frequency on which measurements are being performed. During this gap duration, the UE cannot be scheduled by the eNB on the current serving frequency. Knowledge of the timing of the discovery signals is especially important when the use of such measurement gaps is needed. Beyond mitigating UE complexity, this also ensures that the UE is not unavailable for scheduling for prolonged periods of time on the current serving frequencies (PCell or SCell).

The provision of such timing information is done via a Discovery Signal Measurement Timing Configuration (DMTC) that is signaled to the UE. The DMTC provides a window with a duration of 6 ms occurring with a certain periodicity and timing within which the UE may expect to receive discovery signals. The duration of 6 ms is the same as the measurement gap duration as currently defined in LTE and allows the measurement procedures at the UE for discovery signals to be harmonized regardless of the need for measurement gaps. Only one DMTC is provided per carrier frequency including the current serving frequencies. The UE can expect that the network will transmit discovery signals so that all cells that are intended to be discoverable on a carrier frequency transmit discovery signals within the DMTCs. Furthermore, when measurement gaps are needed, it is expected that the network will ensure sufficient overlap between the configured DMTCs and measurement gaps.

2 WLAN

In typical deployments of WLAN, Carrier Sense Multiple Access with Collision Avoidance (CSMA/CA) is used for medium access. This means that the channel is sensed to perform a CCA, and a transmission is initiated only if the channel is declared as Idle. In case the channel is declared as Busy, the transmission is essentially deferred until the channel is deemed to be Idle. When the range of several Access Points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the LBT mechanism is shown in FIG. 6.

3 LAA to Unlicensed Spectrum Using LTE

Up to now, the spectrum used by LTE is dedicated to LTE. This has the advantage that the LTE system does not need to take into account the coexistence issue and the spectrum efficiency can be maximized. However, the spectrum allocated to LTE is limited and, therefore, cannot meet the ever increasing demand for larger throughput from applications/services. Therefore, a new work item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi) systems. Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 7, a UE is connected to a PCell in the licensed band and one or more SCells in the unlicensed band. In this application, a SCell in unlicensed spectrum is also referred to as a License Assisted (LA) SCell.

4 Standalone Operation in Unlicensed Spectrum Using LTE

Recently there have also been proposals to operate LTE in unlicensed spectrum without the aid of a licensed carrier. In such operation, the PCell will also operate on the unlicensed carrier and thus essential control signals and channels will also be subject to unmanaged interference and LBT.

LTE mobility, i.e. to maintain a connection while the UE is moving between different network nodes, is typically done on the PCell. When the PCell is operating in unlicensed spectrum, the signals used for mobility, which are typically PSS/SSS and CRS, are typically transmitted rather sparsely, e.g. in the DRS occasion. In addition, they are all subject to LBT, and thus their presence is not guaranteed.

Further, the rather dense system information broadcast messages that are typically transmitted on the PCell will also need to be transmitted more sparsely and under LBT constraints.

5 Network Synchronization

Network synchronization refers to the degree of time and frequency synchronization the network nodes have. The degree of synchronization typically varies from (1) tight, enough for advanced transmission techniques, which in today's LTE system is on the microsecond level, (2) coarse synchronization, which is enough for aligning, e.g., DRS occasions with DMTC windows and measurement gaps and is typically on the millisecond level, and (3) no synchronization.

6 Problem

Particularly when operating in the unlicensed spectrum, some cells may be synchronized while others may not. This presents new challenges with respect to DMTC. As such, there is a need for systems and methods that address these challenges.

SUMMARY

Systems and methods relating to Discovery Signal Measurement Timing Configuration (DMTC) are disclosed. In some embodiments, a method of operation of a radio access node in a cellular communications network comprises sending, to a wireless device, a DMTC for one of a group consisting of: (a) a frequency on which one or more asynchronous cells are operating, an asynchronous cell being a cell that is unsynchronized with a Primary Cell (PCell) of the wireless device, and (b) a Secondary Cell (SCell) configured for the wireless device such that the DMTC is a specific DMTC for the SCell. A DMTC configuration that is specific to a SCell provides improved measurement performance on the SCell because, e.g., the DMTC configuration can be specifically tailored to that SCell. A DMTC configuration for a frequency on which one or more asynchronous cells are operating provides improved measurement performance on that carrier.

In some embodiments, the DMTC is a DMTC for a SCell configured for the wireless device. Further, in some embodiments, sending the DMTC comprises sending, to the wireless device, a message that configures the SCell for the wireless device, the message comprising the DMTC for the SCell such that the DMTC is a specific DMTC for the SCell. In some embodiments, the message is an RRCConnectionReconfiguration message.

In some embodiments, the DMTC is a DMTC for the frequency on which one or more asynchronous cells are operating. Further, in some embodiments, sending the DMTC comprises transmitting system information comprising an indication of whether one or more intra-frequency asynchronous cells are operating on the frequency and the DMTC for the frequency to be used by the wireless device if the indication is set to a value that indicates that one or more intra-frequency asynchronous cells are operating on the frequency. In some embodiments, the system information is a System Information Block type 3 (SIB3) information element. In some other embodiments, sending the DMTC comprises transmitting system information comprising an indication of whether one or more inter-frequency asynchronous cells are operating on the frequency and the DMTC for the frequency to be used by the wireless device if the indication is set to a value that indicates that one or more inter-frequency asynchronous cells are operating on the frequency. In some embodiments, the system information is a SIB type 5 (SIB5) information element. In some other embodiments, sending the DMTC comprises transmitting a measurement object to the wireless device, the measurement object comprising an indication of whether one or more asynchronous cells are operating on the frequency and the DMTC for the frequency to be used by the wireless device if the indication is set to a value that indicates that one or more asynchronous cells are operating on the frequency.

In some embodiments, sending the DMTC comprises sending the DMTC and a second DMTC, the DMTC and the second DMTC being separate DMTCs and one of the DMTCs is associated with an asynchronous indication and the other DMTC is associated with a synchronous indication.

In some embodiments, the DMTC is a DMTC for the frequency on which one or more asynchronous cells are operating, and sending the DMTC comprises sending the DMTC together with an asynchronous indication that indicates whether any asynchronous cells are operating on the frequency and a second DMTC for the frequency together with an indication of whether any synchronous cells are operating on the frequency.

In some embodiments, the method further comprises determining whether to configure a cell as a SCell of the wireless device and, upon determining to configure the cell as a SCell of the wireless device, determining whether an asynchronous indication has been provided for a carrier frequency on which the cell operates. Sending the DMTC comprises, upon determining that the asynchronous indication has been provided, sending the DMTC for the cell in a message that adds the cell as a SCell of the wireless device.

Embodiments of a radio access node for a cellular communications network are also disclosed. In some embodiments, a radio access node for a cellular communications network comprises a processor and memory comprising instructions executable by the processor whereby the radio access node is operable to send, to a wireless device, a DMTC for one of a group consisting of: (a) a frequency on which one or more asynchronous cells are operating, an asynchronous cell being a cell that is unsynchronized with a PCell of the wireless device, and (b) a SCell configured for the wireless device such that the DMTC is a specific DMTC for the SCell.

In some embodiments, a radio access node for a cellular communications network is adapted to send, to a wireless device, a DMTC for one of a group consisting of: (a) a frequency on which one or more asynchronous cells are operating, an asynchronous cell being a cell that is unsynchronized with a PCell of the wireless device, and (b) a SCell configured for the wireless device such that the DMTC is a specific DMTC for the SCell. In some embodiments, the radio access node is further operable to operate according to any one of the embodiments of the method of operation of a radio access node disclosed herein.

In some embodiments, a radio access node for a cellular communications network comprises a sending module operable to send, to a wireless device, a DMTC for one of a group consisting of: (a) a frequency on which one or more asynchronous cells are operating, an asynchronous cell being a cell that is unsynchronized with a PCell of the wireless device, and (b) a SCell configured for the wireless device such that the DMTC is a specific DMTC for the SCell.

Embodiments of a method of operation of a wireless device in a cellular communications network are also disclosed. In some embodiments, a method of operation of a wireless device in a cellular communications network comprises receiving a DMTC for at least one of: (a) a frequency on which one or more asynchronous cells are operating, the one or more asynchronous cells being one or more cells that are unsynchronized with a PCell of the wireless device, and (b) a SCell configured for the wireless device such that the DMTC is a specific DMTC for the SCell. The method further comprises utilizing the DMTC.

In some embodiments, the DMTC is a DMTC for a SCell configured for the wireless device. Further, in some embodiments, receiving the DMTC comprises receiving a message that configures the SCell for the wireless device, the message comprising the DMTC for the SCell such that the DMTC is a specific DMTC for the SCell. In some embodiments, the message is an RRCConnectionReconfiguration message.

In some embodiments, the DMTC is a DMTC for a frequency on which one or more asynchronous cells are operating. Further, in some embodiments, receiving the DMTC comprises receiving system information comprising an indication of whether one or more intra-frequency asynchronous cells are operating on the frequency and the DMTC for the frequency to be used by the wireless device if the indication is set to a value that indicates that one or more intra-frequency asynchronous cells are operating on the frequency. In some embodiments, the system information is a SIB3 information element. In some other embodiments, receiving the DMTC comprises receiving system information comprising an indication of whether one or more inter-frequency asynchronous cells are operating on the frequency and the DMTC for the frequency to be used by the wireless device if the indication is set to a value that indicates that one or more inter-frequency asynchronous cells are operating on the frequency. In some embodiments, the system information is a SIB5 information element. In some other embodiments, receiving the DMTC comprises receiving a measurement object, the measurement object comprising an indication of whether one or more asynchronous cells are operating on the frequency and the DMTC for the frequency to be used by the wireless device if the indication is set to a value that indicates that one or more asynchronous cells are operating on the frequency.

In some embodiments, receiving the DMTC comprises receiving the DMTC and a second DMTC, the DMTC and the second DMTC being separate DMTCs and one of the DMTCs is associated with an asynchronous indication and the other DMTC is associated with a synchronous indication.

In some embodiments, the DMTC is a DMTC for the frequency on which one or more asynchronous cells are operating, and receiving the DMTC comprises receiving the DMTC together with an asynchronous indication that indicates whether any asynchronous cells are operating on the frequency and a second DMTC for the frequency together with an indication of whether any synchronous cells are operating on the frequency.

In some embodiments, utilizing the DMTC comprises determining that the message that configures the SCell for the wireless device comprises the DMTC for the SCell and, upon determining that the message comprises the DMTC for the SCell, prioritizing measurements according to the DMTC for the SCell. Further, in some embodiments, utilizing the DMTC further comprises determining whether an asynchronous indication has been received for a carrier frequency on which the SCell operates and, upon determining that an asynchronous indication has been received, performing best effort measurements on neighbor cells on the carrier frequency on which the SCell operates.

Embodiments of a wireless device for a cellular communications network are also disclosed. In some embodiments, a wireless device for a cellular communications network comprises a transceiver, a processor, and memory comprising instructions executable by the processor whereby the wireless device is operable to receive a DMTC for at least one of: (a) a frequency on which one or more asynchronous cells are operating, the one or more asynchronous cells being one or more cells that are unsynchronized with a PCell of the wireless device, and utilize the DMTC, and (b) a SCell configured for the wireless device such that the DMTC is a specific DMTC for the SCell.

In some embodiments, a wireless device for a cellular communications network is adapted to receive a DMTC for at least one of: (a) a frequency on which one or more asynchronous cells are operating, the one or more asynchronous cells being one or more cells that are unsynchronized with a PCell of the wireless device, and (b) a SCell configured for the wireless device such that the DMTC is a specific DMTC for the SCell. The wireless device is further adapted to utilize the DMTC. In some embodiments, the wireless device is further adapted to operate according to any one of the embodiments of the method of operation of a wireless device disclosed herein.

In some embodiments, a wireless device for a cellular communications network comprises a receiving module and a utilizing module. The receiving module is operable to receive a DMTC for at least one of: (a) a frequency on which one or more asynchronous cells are operating, the one or more asynchronous cells being one or more cells that are unsynchronized with a PCell of the wireless device, and (b) a SCell configured for the wireless device such that the DMTC is a specific DMTC for the SCell. The utilizing module is operable to utilize the DMTC.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure. In the drawings, like reference labels denote like features.

DETAILED DESCRIPTION

Figure 1:
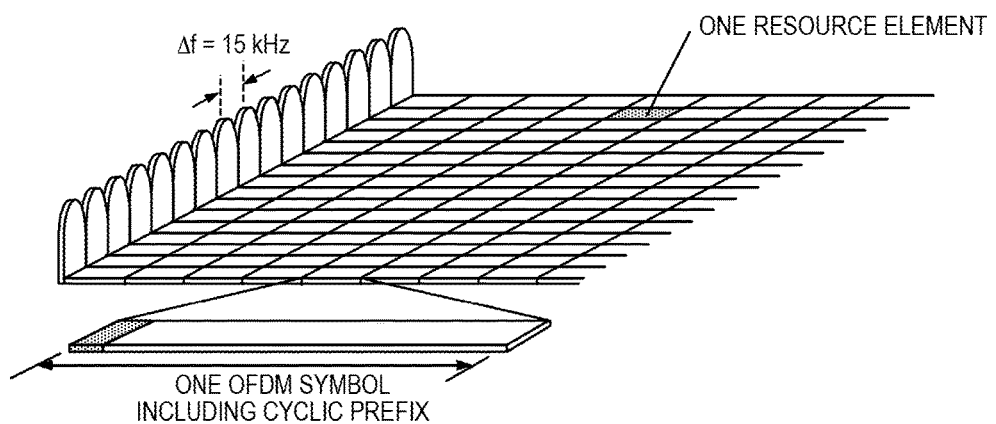
FIG. 1 illustrates a Long Term Evolution (LTE) downlink physical resource.
Figure 2:
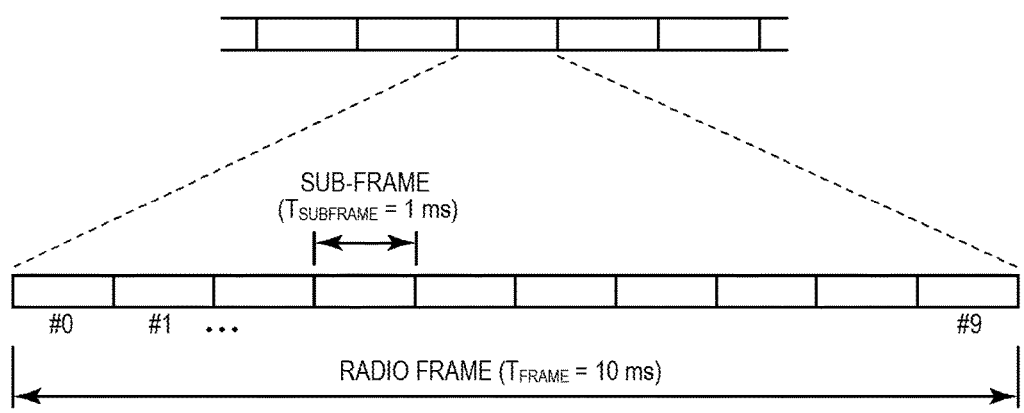
FIG. 2 illustrates an LTE time-domain structure.
Figure 3:
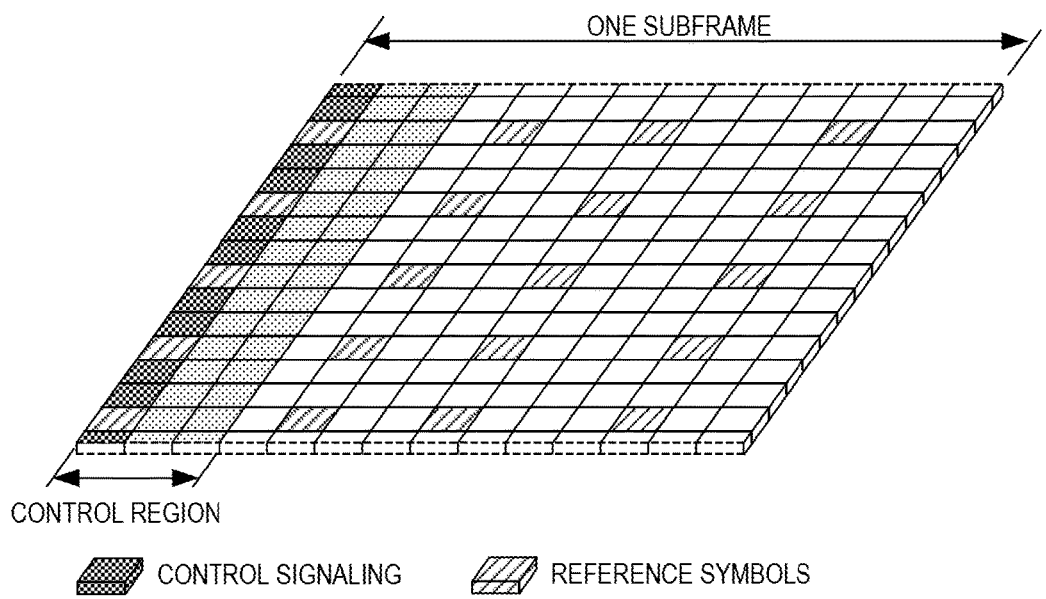
FIG. 3 illustrates an example of an LTE downlink subframe.
Figure 4:
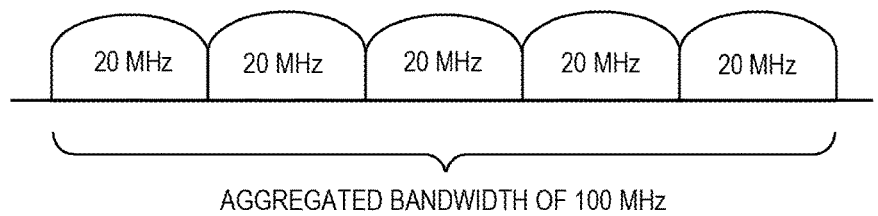
FIG. 4 illustrates Carrier Aggregation (CA)
Figure 5:
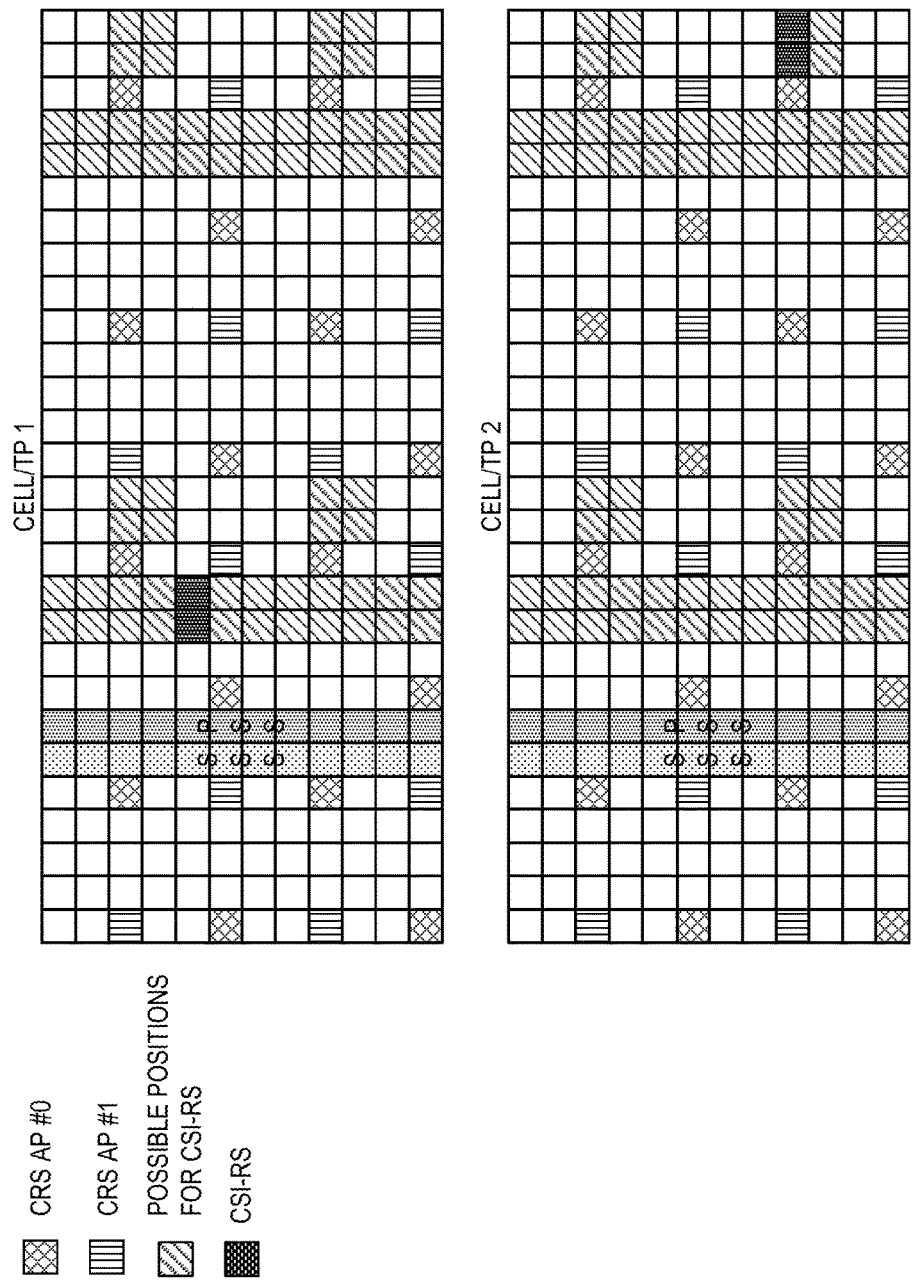
FIG. 5 illustrates one example of a discovery signal in LTE.
Figure 6:
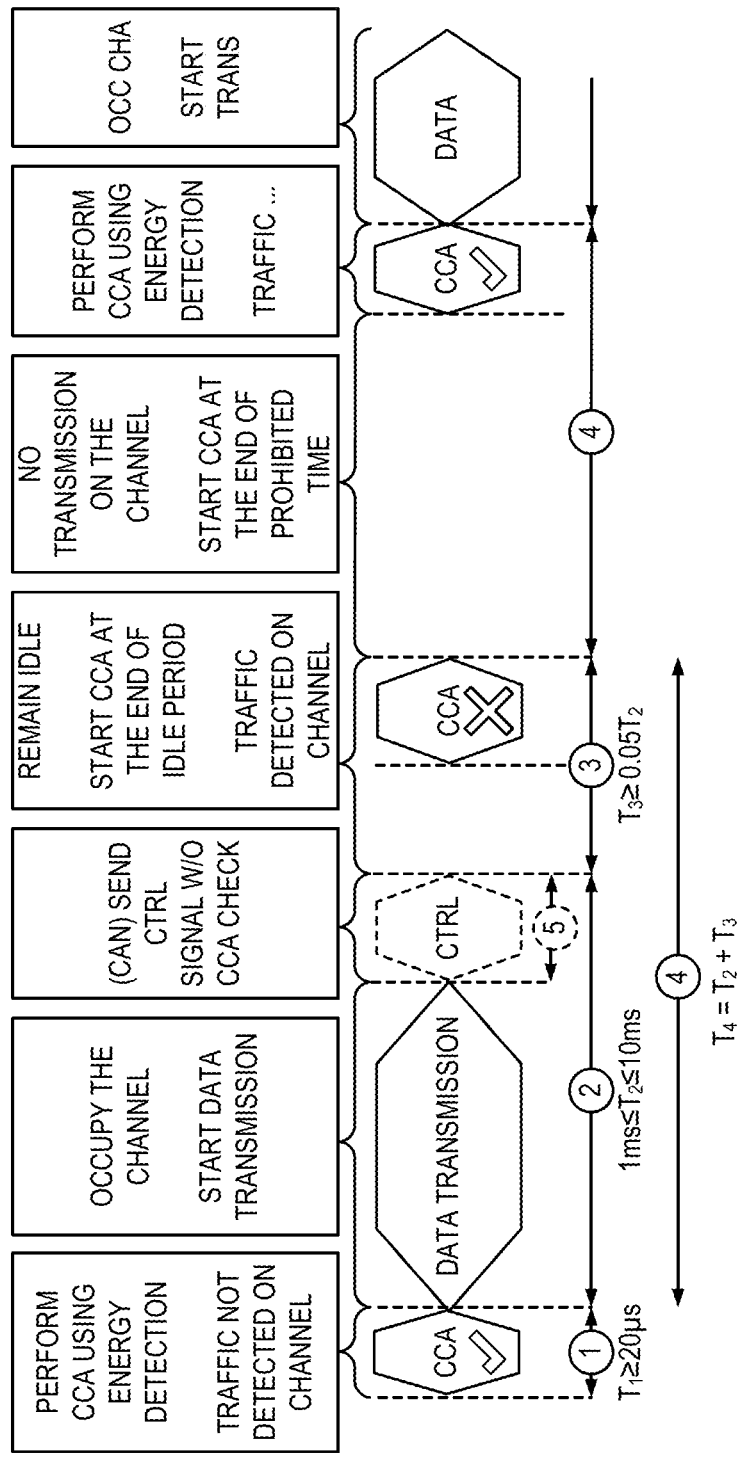
FIG. 6 illustrates Listen-Before-Talk (LBT)
Figure 7:
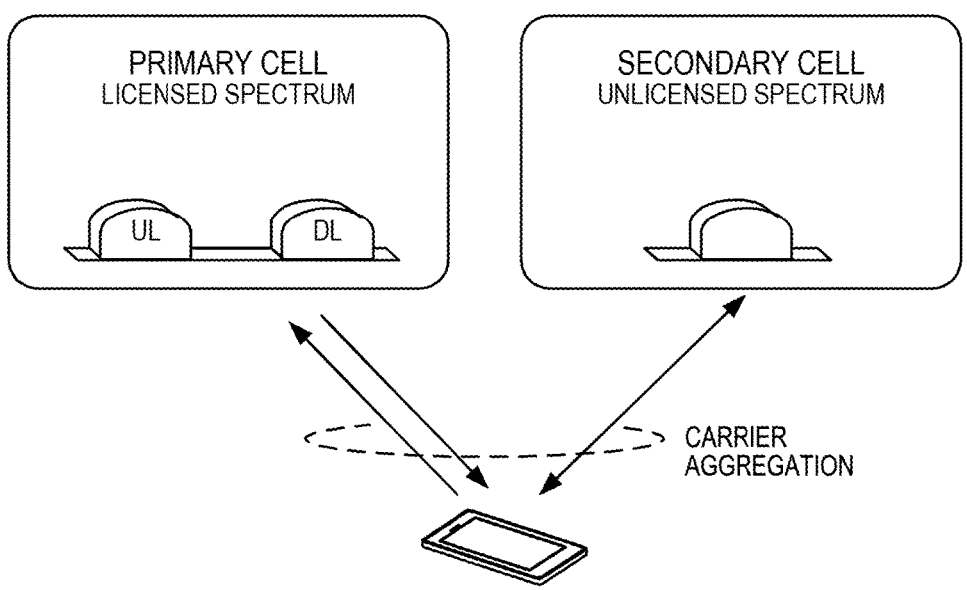
FIG. 7 illustrates License Assisted Access (LAA) to unlicensed spectrum using LTE CA.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As discussed above, in a conventional Third Generation Partnership Project (3GPP) Long Term Evolution (LTE) system, a single Discovery Signal Measurement Timing Configuration (DMTC) is provided for each carrier frequency. A problem arises, particularly when operating in the unlicensed spectrum (e.g., LTE in the Unlicensed Band (LTE-U) Standalone or MulteFire), when asynchronous cells (i.e., cells that are not synchronized with the Primary Cell (PCell) of the User Equipment device (UE)) are operating on a frequency for which the UE is configured to perform measurements such as, e.g., Radio Resource Management (RRM) measurements for mobility purposes. In this case, it is desirable to perform measurements on both synchronized and unsynchronized cells. However, the conventional DMTC per carrier frequency assumes synchronized cells and, as such, is unsuitable for unsynchronized cells. One way to address this issue is for the UE to "look everywhere" for the Discovery Reference Signals (DRSs) of unsynchronized cells. However, this has at least two problems. First, "looking everywhere" will result in the UE being active for longer periods of time and, consequently, a significant increase in power consumption. Second, the UE has no way of knowing whether there are unsynchronized cells on the carrier frequency and, as such, may expend valuable resources search for unsynchronized cells when there are none. At least some of the embodiments disclosed herein address these problems.

In certain embodiments the same DMTC configuration that is provided in an enhanced System Information Block (eSIB) or MulteFire System Information Block (SIB-MF) for the (primary) serving cell is also used for the (not yet configured) Secondary Cell(s) (SCell(s)) ("option 1"). Note that the terms "DMTC" and "DMTC configuration" are used interchangeably herein. In certain other embodiments, it is assumed that there are cells on the frequencies indicated in System Information Block type 5 (SIB5) that are synchronous with the PCell, and assume minimum periodicity for the DMTC periodicity, i.e. 40 milliseconds (ms), and maximum duration for the DMTC duration (10 ms) ("option 2"). In certain embodiments, the DMTC for the SCells is provided via dedicated signaling ("option 3").

Certain embodiments are presented in recognition of shortcomings associated with alternative approaches, such as the following. Certain approaches provide the DMTC for a frequency, resulting in reduced measurement performance on the SCells, such that potential data rates on the SCells cannot be achieved.

Certain embodiments may also provide one or more benefits compared to conventional approaches. For example, in "option 1" embodiments, the information may be provided in a System Information Block (SIB) and in a Measurement Object (measObject) before SCells are added. Thus, the measurement performance for potential SCells can be improved leading to faster decisions for the enhanced or evolved Node B (eNB) as to whether to add another SCell for the UE or not. As another example, in "option 2" embodiments where it is assumed that there are cells on the frequencies indicated in SIB5 that are synchronous with the PCell, and minimum periodicity for the DMTC periodicity, i.e. 40 ms, and maximum duration for the DMTC duration (10 ms) are assumed, there may be better measurement performance if there are potential SCells and there could also be some battery savings if there are synchronized cells. As yet another example, "option 3" embodiments may exhibit improved measurement performance on the SCells, and potentially reduced UE power consumption if the DMTC of SCells is known and measurements on the same frequency have to be performed less often.

For option 1 and 2, the UE assumes that there are cell(s) on the carrier frequencies indicated in SIB5 that may potentially be configured as SCell(s), even if the async bit is set to true. In other words, for example, the SIB5 may include an async bit that, if set, indicates that there are cells on the corresponding frequency that are asynchronous.

For option 1, there are different approaches:
  1a) The field description for the servCellDMTC in the eSIB/SIB-MF could be updated to apply to the PCell and all cells that can be configured as SCells, e.g. cells that are potentially operated by, e.g., the serving eNB (could also be inter-node Carrier Aggregation (CA) if the cells are tightly synchronized and the operating eNBs have an interface for fast data exchange).
  1b) There could be an additional bit indicating in the SIB-MF that the servCellDMTC shall be used for the SCells.
  1c) There could be an additional bit in SIB5 indicating that the eNB operates synchronous cells on the carrier frequency indicated by (dl-)CarrierFreq, e.g. sync-NeighCells.

1d) There could be an additional bit in the measObject indicating that the eNB operates synchronous cells on the carrier frequency indicated by (dl-)CarrierFreq, e.g. syncNeighCells. For options 1c and 1d, the eNB could provide the UE with accurate DMTC configuration.

1e) There are two separate DMTC configurations, one together with the async indication (where the DMTC could be empty), and one together with the sync indication. Notably, these two indications may be implemented in any suitable manner. As will be appreciated by one of skill in the art, the two indications may be implemented as different parameters (e.g., an async parameter and a sync parameter) or as a single parameter. As an example, the two indications may be implemented as a single async parameter where the async parameter operates as both an async indication and a sync indication.

One example for SIB5 and, e.g., measObject:

```
[[      asyncNeighCells-MF      BOOLEAN         OPTIONAL  -- Need
OP
        neighborCellDMTC-MF     MeasDS-         OPTIONAL  -- Need
                                Config-MF
OP
]]
```

This example for SIB5 and, e.g., measObject may be used to provide an async indication (referred to as asyncNeighCells-MF) that, if set, indicates that there are asynchronous cells on the respective frequency. If the async indication is set to a value that indicates that one or more asynchronous neighbor cells are operating on the frequency, then the DMTC (neighborCellDMTC-MF) is the DMTC for the asynchronous neighbor cells (i.e., cells that are not serving cells of the UE that operate on the respective frequency identified by SIB5 or measObject).

Example for options 1c/1d in SIB5 and, e.g., measObject:

```
[[      asyncNeighCells-MF      BOOLEAN         OPTIONAL  -- Need
OP
        syncNeighCell-MF        BOOLEAN         OPTIONAL  -- Need
OP
        neighborCellDMTC-MF     MeasDS-         OPTIONAL  -- Need
                                Config-MF
OP
]]
```

This example is for SIB5 and, e.g., measObject where there is an additional indication of whether there are any synchronous cells on the respective frequency.

Example for option 1e in SIB5 and, e.g., measObject:

```
[[  asyncNeighCellInfo-MF       SEQUENCE {
        asyncNeighCells-MF          ENUMERATED{true},
        asyncNeighCellDMTC-MF       MeasDS-Config-MF    OPTIONAL  --
Need OP
        },                                              OPTIONAL  --
Need OP
    syncNeighCellDMTC-MF        MeasDS-Config-MF        OPTIONAL  --
Need OP
]]
```

This example is for SIB5 and, e.g., measObject where the SIB5 or measurement object includes both: (a) a DMTC for asynchronous cells (asyncNeighCellDMTC-MF) together with the async indication (asyncNeighCells-MF) and (b) a separate DMTC for synchronous cells (syncNeighCellD-MTC-MF). While not illustrated in this example, as discussed above, the DMTC for synchronous cells may be provided together with a sync indication, i.e., an indication of whether there are any synchronous cells on the respective frequency.

For the non-synchronized neighbor cells, the DMTC is only provided if available.

For option 2, a sync bit could also be added to SIB5 and the measObject to make the UE aware that there are unsynchronized cells, synchronized cells, or even both on the carrier frequency identified by (dl-)CarrierFreq.

Option 3 can be combined with option 1 or option 2, respectively.

Figure 8:
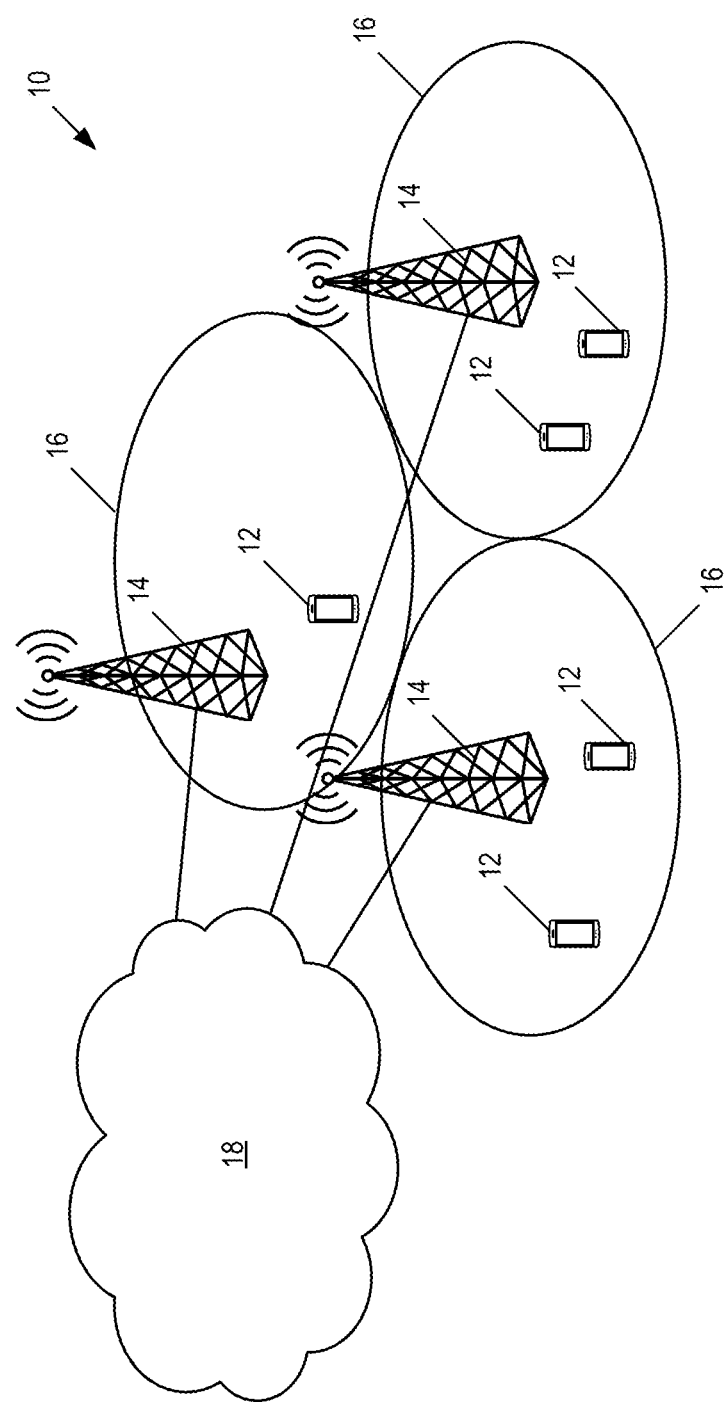
FIG. 8 illustrates one example of a cellular communications network (i.e., an LTE network in this example) in which embodiments of the present disclosure may be implemented.

The embodiments described herein may be implemented in any appropriate type of communication system supporting any suitable communication standards and using any suitable components. As one example, certain embodiments may be implemented in an LTE network, such as that illustrated in FIG. 8. Referring to FIG. 8, a communication network 10 comprises a plurality of wireless communication devices 12 (e.g., UEs such as, but not limited to, regular UEs, Machine Type Communication (MTC)/Machine-to-Machine (M2M) UEs, or the like) and a plurality of radio access nodes 14 (e.g., eNBs or other base stations). The wireless communication devices 12 are also referred to herein as wireless devices 12. Further, it is to be understood that the UEs referred to herein are one embodiment of the wireless devices 12. The communication network 10 is organized into cells 16, which are connected to a core network 18 via the corresponding radio access nodes 14. The radio access nodes 14 are capable of communicating with the wireless communication devices 12 along with any additional elements suitable to support communication between wireless communication devices or between a wireless communication device and another communication device (such as a landline telephone).

As discussed above, there may be multiple levels of DMTC. Specifically, at one level, the network (e.g., the radio access node 14, which may be, e.g., an eNB) provides a DMTC to the wireless device 12 (e.g., UE) that is specific for a configured (i.e., an added) SCell of the wireless device 12. In this case, the DMTC may be provided via dedicated signaling such as, for example, an RRCConnectionReconfiguration message in which the SCell is configured for the wireless device 12. By being specifically for the SCell, the DMTC may be narrowly tailored for that particular SCell, which in turn improves performance of the wireless device 12. At another level, the network (e.g., radio access node 14) provides a DMTC to the wireless device 12 for synchronous cells on a particular carrier frequency. In this case, the DMTC may be included in system information (e.g., SIB3 or SIB5) or included in a measurement object used to configure the wireless device 12 to perform measurements on that carrier frequency. Since the cells are synchronous, the DMTC configuration may be tailored to synchronous cells (i.e., does not need to accommodate asynchronous cells), which in turn improves performance. At yet another level, the network (e.g., radio access node 14) provides a DMTC to the wireless device 12 for asynchronous cells on a particular carrier frequency. In this case, the DMTC may be included in system information (e.g., SIB3 or SIB5) or included in a measurement object used to configure the wireless device 12 to perform measurements on that carrier frequency. Since the cells are asynchronous, the DMTC configuration may be tailored to asynchronous cells (e.g., longer DMTC duration or window than for synchronous cells) while still keeping the wireless device 12 from having to, e.g., search in all possible time resources for discovery signals from the asynchronous cells. Further, in some embodiments, the async indication and/or the sync indication inform the wireless device 12 as to whether there are asynchronous cells and/or synchronous cells on the respective carrier frequency. This further enables the wireless device 12 to use appropriate DMTC.

Figure 9:
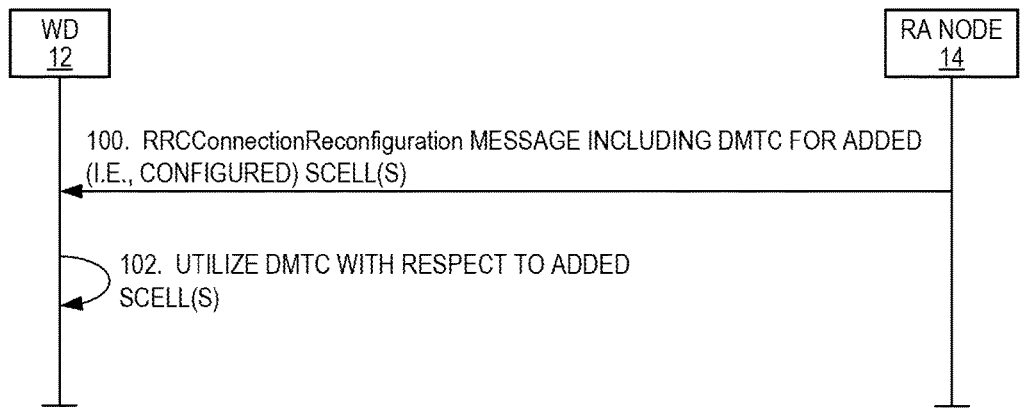
FIG. 9 illustrates a process by which a Discovery Signal Measurement Timing Configuration (DMTC) for a Secondary Cell (SCell) is provided to a wireless device in a message in which the SCell is added (i.e., configured) for the wireless device according to some embodiments of the present disclosure.

In this regard, FIG. 9 illustrates the operation of the radio access node 14 and the wireless device 12 according to some embodiments of the present disclosure in which the radio access node 14 provides a DMTC to the wireless device 12 for a SCell configured (i.e., added) for the wireless device 12 via dedicated signaling. As illustrated, in this example, the radio access node 14 sends an RRCConnectionReconfiguration message to the wireless device 12, where the RRCConnectionReconfiguration message configures one or more SCells for the wireless device 12 and includes, for each configured SCell, a DMTC specifically for the configured SCell (step 100). Note that the RRCConnectionReconfiguration message is only one example of dedicated signaling. Other types of dedicated signaling may alternatively be used. The wireless device 12 utilizes the DMTC(s) for the configured, or added, SCell(s) (step 102). The wireless device 12 may use the DMTCs to perform measurements such as RRM measurements on the configured SCell(s).

Below, example ASN.1 coded for dedicated Radio Resource Control (RRC) signaling and a new RRCConnectionReconfiguration message including the SCell DMTC are provided. Portions relating to the DMTC for the SCell are in bold and italicized.

The RRCConnectionReconfiguration message is the command to modify an RRC connection. It may convey information for measurement configuration, mobility control, radio resource configuration (including resource blocks, Medium Access Control (MAC) main configuration, and physical channel configuration) including any associated dedicated Non-Access Stratum (NAS) information and security configuration.

ASN.1 Code for Dedicated RRC Signaling (from 3GPP Technical Specification (TS) 36.331):

```
RRCConnectionReconfiguration-v1020-IEs ::= SEQUENCE {
    sCellToReleaseList-r10      SCellToReleaseList-r10              OPTIONAL, --
Need ON
    sCellToAddModList-r10       SCellToAddModList-r10               OPTIONAL, --
Need ON
    nonCriticalExtension        RRCConnectionReconfiguration-v1130-IEs   OPTIONAL
}
```

RRCConnectionReconfiguration message

```
-- ASN1START
RRCConnectionReconfiguration ::=                SEQUENCE {
    rrc-TransactionIdentifier                       RRC-TransactionIdentifier,
    criticalExtensions                              CHOICE {
        c1                                              CHOICE{
            rrcConnectionReconfiguration-r8                 RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture                        SEQUENCE { }
    }
}
RRCConnectionReconfiguration-r8-IEs ::=         SEQUENCE {
    measConfig                                      MeasConfig                              OPTIONAL, --
Need ON
    mobilityControlInfo                             MobilityControlInfo                     OPTIONAL, --
Cond HO
    dedicatedInfoNASList                            SEQUENCE (SIZE (1..maxDRB)) OF
                                                                    DedicatedInfoNAS        OPTIONAL, --
Cond nonHO
    radioResourceConfigDedicated                    RadioResourceConfigDedicated            OPTIONAL, -- Cond
HO-toEUTRA
    securityConfigHO                                SecurityConfigHO                        OPTIONAL, --
Cond HO
    nonCriticalExtension                            RRCConnectionReconfiguration-v890-IEs   OPTIONAL
}
RRCConnectionReconfiguration-v890-IEs ::= SEQUENCE {
    lateNonCriticalExtension                        OCTET STRING (CONTAINING
RRCConnectionReconfiguration-v8m0-IEs)                              OPTIONAL,
    nonCriticalExtension                            RRCConnectionReconfiguration-v920-IEs   OPTIONAL
}
-- Late non-critical extensions:
RRCConnectionReconfiguration-v8m0-IEs ::= SEQUENCE {
    -- Following field is only for pre REL-10 late non-critical extensions
```

| RRCConnectionReconfiguration message | | |
|---|---|---|
| lateNonCriticalExtension | OCTET STRING | OPTIONAL, |
| nonCriticalExtension | RRCConnectionReconfiguration-v10i0-IEs | OPTIONAL |

```
}
RRCConnectionReconfiguration-v10i0-IEs ::= SEQUENCE {
    antennaInfoDedicatedPCell-v10i0       AntennaInfoDedicated-v10i0              OPTIONAL, -- Need ON
    -- Following field is only for late non-critical extensions from REL-10
    nonCriticalExtension                  SEQUENCE { }                            OPTIONAL
}
-- Regular non-critical extensions:
RRCConnectionReconfiguration-v920-IEs ::= SEQUENCE {
    otherConfig-r9                        OtherConfig-r9                          OPTIONAL, -- Need ON
    fullConfig-r9                         ENUMERATED {true}                       OPTIONAL, -- Cond HO-Reestab
    nonCriticalExtension                  RRCConnectionReconfiguration-v10i0-IEs  OPTIONAL
}
RRCConnectionReconfiguration-v1020-IEs ::= SEQUENCE {
    sCellToReleaseList-r10                SCellToReleaseList-r10                  OPTIONAL, -- Need ON
    sCellToAddModList-r10                 SCellToAddModList-r10                   OPTIONAL, -- Need ON
    nonCriticalExtension                  RRCConnectionReconfiguration-v1130-IEs  OPTIONAL
}
RRCConnectionReconfiguration-v1130-IEs ::= SEQUENCE {
    systemInfomationBlockType1Dedicated-r11  OCTET STRING (CONTAINING SystemInformationBlockType1)   OPTIONAL, -- Need ON
    nonCriticalExtension                  RRCConnectionReconfiguration-v1250-IEs  OPTIONAL
}
RRCConnectionReconfiguration-v1250-IEs ::= SEQUENCE {
    wlan-OffloadInfo-r12                  CHOICE {
        release                               NULL,
        setup                                 SEQUENCE {
            wlan-OffloadConfigDedicated-r12       WLAN-OffloadConfig-r12,
            t350-r12                              ENUMERATED (min5, min10, min20, min30, min60,
                                                              min120, min180, spare1}   OPTIONAL - Need OR
        }
    }                                                                             OPTIONAL, - Need ON
    scg-Configuration-r12                 SCG-Configuration-r12                   OPTIONAL, -- Cond nonFullConfig
    sl-SyncTxControl-r12                  SL-SyncTxControl-r12                    OPTIONAL, -- Need ON
    sl-DiscConfig-r12                     SL-DiscConfig-r12                       OPTIONAL, -- Need ON
    sl-CommConfig-r12                     SL-CommConfig-r12                       OPTIONAL, -- Need ON
    nonCriticalExtension                  RRCConnectionReconfiguration-v1310-IEs  OPTIONAL
}
RRCConnectionReconfiguration-v1310-IEs ::= SEQUENCE {
    sCellToReleaseListExt-r13             SCellToReleaseListExt-r13               OPTIONAL, -- Need ON
    sCellToAddModListExt-r13              SCellToAddModListExt-r13                OPTIONAL, -- Need ON
    lwa-Configuration-r13                 LWA-Configuration-r13                   OPTIONAL, -- Need ON
    lwip-Configuration-r13                LWIP-Configuration-r13                  OPTIONAL, -- Need ON
    steeringCommandWLAN-r13               CHOICE {
        release                               NULL,
        setup                                 SEQUENCE {
            command                               CHOICE {
                steerToWLAN-r13                       WLAN-Id-List-r12,
                steerToLTE-r13                        NULL
            },
            ...
        }
    }                                                                             OPTIONAL, -- Need ON
    nonCriticalExtension                  RRCConnectionReconfiguration-MF-IEs     OPTIONAL
}
RRCConnectionReconfiguration-MF-IEs ::= SEQUENCE {
```

| RRCConnectionReconfiguration message | | |
|---|---|---|
| sCellToReleaseListExt-MF | SCellToReleaseListExt-r13 | OPTIONAL, -- Need ON |
| sCellToAddModListExt-MF | SCellToAddModListExt-MF | OPTIONAL, -- Need ON |
| lwa-Configuration-MF | LWA-Configuration-r13 | OPTIONAL, -- Need ON |
| lwip-Configuration-MF | LWIP-Configuration-r13 | OPTIONAL, -- Need ON |
| steeringCommandWLAN-MF    release    setup        command            steerToWLAN-MF            steerToLTE-MF        },        ...    } | CHOICE {    NULL,    SEQUENCE {        CHOICE {            WLAN-Id-List-r12,            NULL | |
| } | | OPTIONAL, -- Need ON |
| nonCriticalExtension | SEQUENCE {} | OPTIONAL |
| } | | |

```
SL-SyncTxControl-r12 ::=            SEQUENCE {
    networkControlledSyncTx-r12         ENUMERATED {on, off}              OPTIONAL - - Need OP
}
PSCellToAddMod-r12 ::=              SEQUENCE {
    sCellIndex-r12                      SCellIndex-r10,
    cellIdentification-r12              SEQUENCE {
        physCellId-r12                      PhysCellId,
        dl-CarrierFreq-r12                  ARFCN-ValueEUTRA-r9
    }                                                                     OPTIONAL,
Cond SCellAdd
    radioResourceConfigCommonPSCell-r12 RadioResourceConfigCommonPSCell-r12            OPTIONAL,
-- Cond SCellAdd
    radioResourceConfigDedicatedPSCell-r12  RadioResourceConfigDedicatedPSCell-r12
    OPTIONAL,    -- Cond SCellAdd2
    ...,
    [[  antennaInfoDedicatedPSCell-v1280    AntennaInfoDedicated-v10i0   OPTIONAL - - Need ON
    ]],
    [[  sCellIndex-r13                      SCellIndex-r13   OPTIONAL                  -- Need ON
    ]]
}
PowerCoordinationInfo-r12 ::= SEQUENCE {
    p-MeNB-r12                          INTEGER (1..16),
    p-SeNB-r12                          INTEGER (1..16),
    powerControlMode-r12                INTEGER (1..2)
}
SCellToAddModList-r10 ::=           SEQUENCE (SIZE (1..maxSCell-r10)) OF SCellToAddMod-r10
SCellToAddModListExt-r13 ::=        SEQUENCE (SIZE (1..maxSCell-r13)) OF SCellToAddModExt-r13
```

*SCellToAddModListExt-MF ::=SEQUENCE (SIZE (1...maxSCell-r13))OF SCellToAddModExt-MF*

```
SCellToAddMod-r10 ::=               SEQUENCE {
    sCellIndex-r10                      SCellIndex-r10,
    cellIdentification-r10              SEQUENCE {
        physCellId-r10                      PhysCellId,
        dl-CarrierFreq-r10                  ARFCN-ValueEUTRA
    }                                                                     OPTIONAL, -- Cond
SCellAdd
    radioResourceConfigCommonSCell-r10  RadioResourceConfigCommonSCell-r10             OPTIONAL,
-- Cond SCellAdd
    radioResourceConfigDedicatedSCell-r10   RadioResourceConfigDedicatedSCell-r10
    OPTIONAL, -- Cond SCellAdd2
    ...,
    [[  dl-CarrierFreq-v1090                ARFCN-ValueEUTRA-v9e0   OPTIONAL   -- Cond
EARFCN-max
    ]],
    [[  antennaInfoDedicatedSCell-v10i0     AntennaInfoDedicated-v10i0                OPTIONAL --
Need ON
    ]]
```
    *[[ measDS-Config-MF                            MeasDS-Config-MF           OPTIONAL --*
*Need ON*
    *]]*
```
}
SCellToAddModExt-r13 ::=            SEQUENCE {
    sCellIndex-r13                      SCellIndex-r13,
    cellIdentification-r13              SEQUENCE {
        physCellId-r13                      PhysCellId,
```

-continued

| RRCConnectionReconfiguration message |
|---|

```
            dl-CarrierFreq-r13             ARFCN-ValueEUTRA-r9
        }                                                                                OPTIONAL, -- Cond
SCellAdd
        radioResourceConfigCommonSCell-r13   RadioResourceConfigCommonSCell-r10          OPTIONAL,
-- Cond SCellAdd
        radioResourceConfigDedicatedSCell-r13   RadioResourceConfigDedicatedSCell-r10
OPTIONAL, -- Cond SCellAdd2
        antennaInfoDedicatedSCell-r13        AntennaInfoDedicated-v10i0                  OPTIONAL -
- Need ON}
SCellToAddModExt-MF ::=                 SEQUENCE {
        sCellIndex-MF                        SCellIndex-r13,
        cellIdentification-MF                SEQUENCE {
            physCellId-MF                        PhysCellId,
            dl-CarrierFreq-MF                    ARFCN-ValueEUTRA-r9
                                                                            OPTIONAL,  --Cond
SCellAdd
        radioResourceConfigCommonSCell-MF        RadioResourceConfigCommonScell-r10
OPTIONAL,
            --Cond SCellAdd
        radioResourceConfigDedicatedSCell-MF     RadioResourceConfigDedicatedSCell-r10
OPTIONAL,
            --Cond SCellAdd2
        antennaInforDedicatedSCell-MF            AntennaInfoDedicated-y10i0              OPTIONAL -
- Need ON
        measDS-Config-MF                         MeasDS-Config-MF                        OPTIONAL -
- Need ON
        . . .
}
SCellToReleaseList-r10 ::=              SEQUENCE (SIZE (1..maxSCell-r10)) OF SCellIndex-r10
SCellToReleaseListExt-r13 ::=           SEQUENCE (SIZE (1..maxSCell-r13)) OF SCellIndex-
r13
SCG-Configuration-r12 ::=               CHOICE {
        release                             NULL,
        setup                               SEQUENCE {
            scg-ConfigPartMCG-r12               SEQUENCE {
                scg-Counter-r12                     INTEGER (0.. 65535)                 OPTIONAL, -
- Need ON
                powerCoordinationInfo-r12           PowerCoordinationInfo-r12           OPTIONAL, -
- Need ON
                . . .
            }                                                                           OPTIONAL, --
Need ON
            scg-ConfigPartSCG-r12               SCG-ConfigPartSCG-r12                   OPTIONAL --
Need ON
        }
}
SCG-ConfigPartSCG-r12 ::=               SEQUENCE {
        radioResourceConfigDedicatedSCG-r12     RadioResourceConfigDedicatedSCG-r12 OPTIONAL,  -
- Need ON
        sCellToReleaseListSCG-r12               SCellToReleaseList-r10       OPTIONAL, -- Need
ON
        pSCellToAddMod-r12                      PSCellToAddMod-r12           OPTIONAL, -- Need
ON
        sCellToAddModListSCG-r12                SCellToAddModList-r10        OPTIONAL, -- Need
ON
        mobilityControlInfoSCG-r12              MobilityControlInfoSCG-r12   OPTIONAL, -- Need
ON
        . . . ,
        [[
        sCellToReleaseListSCG-Ext-r13           SCellToReleaseListExt-r13               OPTIONAL, -
- Need ON
        sCellToAddModListSCG-Ext-r13            SCellToAddModListExt-r13                OPTIONAL -
- Need ON
        ]]
}
SecurityConfigHO ::=                    SEQUENCE {
        handoverType                        CHOICE {
            intraLTE                            SEQUENCE {
                securityAlgorithmConfig             SecurityAlgorithmConfig             OPTIONAL, -
- Cond fullConfig
                keyChangeIndicator                  BOOLEAN,
                nextHopChainingCount                NextHopChainingCount
            },
            interRAT                            SEQUENCE {
                securityAlgorithmConfig             SecurityAlgorithmConfig,
                nas-SecurityParamToEUTRA            OCTET STRING (SIZE(6))
            }
```

| RRCConnectionReconfiguration message |
|---|
| },<br>   ...<br>}<br>-- ASN1STOP |

| RRCConnectionReconfiguration field descriptions |
|---|
| dedicatedInfoNASList |
| This field is used to transfer UE specific NAS layer information between the network and the UE. The RRC layer is transparent for each PDU in the list.<br>fullConfig |
| Indicates the full configuration option is applicable for the RRC Connection Reconfiguration message.<br>keyChangeIndicator |
| true is used only in an intra-cell handover when a $K_{eNB}$ key is derived from a $K_{ASME}$ key taken into use through the latest successful NAS SMC procedure, as described in TS 33.401 [32] for $K_{eNB}$ re-keying. false is used in an intra-LTE handover when the new $K_{eNB}$ key is obtained from the current $K_{eNB}$ key or from the NH as described in TS 33.401 [32].<br>lwa-Configuration |
| This field is used to provide parameters for LWA configuration.<br>lwip-Configuration |
| This field is used to provide parameters for LWIP configuration.<br>measDS-Config |
| Parameters applicable to discovery signals measurement for the SCell indicated by the SCellIndex on the carrier frequency indicated by dl-CarrierFreq. Any other DMTC configuration provided for the carrier frequency indicated by dl-CarrierFreq shall still apply for the neighbor cells on that carrier frequency.<br>nas-securityParamToEUTRA |
| This field is used to transfer UE specific NAS layer information between the network and the UE. The RRC layer is transparent for this field, although it affects activation of AS- security after inter-RAT handover to E-UTRA. The content is defined in TS 24.301.<br>networkControlledSyncTx |
| This field indicates whether the UE shall transmit synchronisation information (i.e. become synchronisation source). Value On indicates the UE to transmit synchronisation information while value Off indicates the UE to not transmit such information.<br>nextHopChainingCount |
| Parameter NCC: See TS 33.401 [32]<br>p-MeNB |
| Indicates the guaranteed power for the MeNB, as specified in 36.213 [23]. The value N corresponds to N − 1 in TS 36.213 [23].<br>powerControlMode |
| Indicates the power control mode used in DC. Value 1 corresponds to DC power control mode 1 and value 2 indicates DC power control mode 2, as specified in 36.213 [23].<br>p-SeNB |
| Indicates the guaranteed power for the SeNB as specified in 36.213 [23, Table 5.1.4.2-1]. The value N corresponds to N − 1 in TS 36.213 [23].<br>sCellIndex |
| In case of DC, the SCellIndex is unique within the scope of the UE i.e. an SCG cell can not use the same value as used for an MCG cell. For pSCellToAddMod, if sCellIndex-r13 is present the UE shall ignore sCellIndex-r12. sCellIndex-r13 in sCellToAddModListExt-r13 shall not have same values as sCellIndex-r10 in sCellToAddModList-r10. |

| RRCConnectionReconfiguration field descriptions |
|---|
| sCellToAddModList, sCellToAddModListExt |
| Indicates the SCell to be added or modified. Indexes 1..7 can be assigned using either sCellToAddModList or sCellToAddModListExt.<br>sCellToAddModListSCG |
| Indicates the SCG cell to be added or modified. The field is used for SCG cells other than the PSCell (which is added/modified by field pSCellToAddMod).<br>sCellToReleaseListSCG |
| Indicates the SCG cell to be released. The field is also used to release the PSCell e.g. upon change of PSCell, upon system information change for the PSCell.<br>scg-Counter |
| A counter used upon initial configuration of SCG security as well as upon refresh of S-$K_{eNB}$. E-UTRAN includes the field upon SCG change when one or more SCG DRBs are configured. Otherwise E-UTRAN does not include the field.<br>steeringCommandWLAN |
| WLAN traffic steering command as specified in 5.6.16.2.<br>t350 |
| Timer T350 as described in section 7.3. Value minN corresponds to N minutes. |

Figure 10:
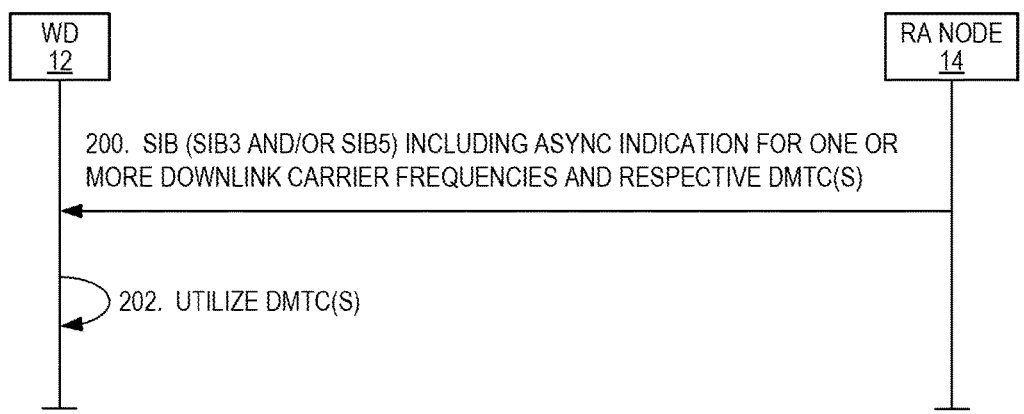
FIG. 10 illustrates a process by which a DMTC for asynchronous neighboring cells is provided to a wireless device in system information according to some embodiments of the present disclosure.

FIG. 10 illustrates the operation of the radio access node 14 and the wireless device 12 according to some embodiments of the present disclosure in which a DMTC(s) is provided to the wireless device 12 for a carrier frequency(ies) together with a respective async indication(s) within system information. As illustrated, the radio access node 14 sends a SIB (e.g., SIB3 and/or SIB5) to the wireless device 12 where the SIB includes: (a) an async indication(s) for a respective downlink carrier frequency(ies) and (b) for each downlink carrier frequency, a DMTC configuration to be used if the async indication for the downlink carrier frequency is set to a value that indicates that one or more asynchronous cells are operating on the downlink carrier frequency (i.e., indicates that there are asynchronous cell(s) on the downlink carrier frequency) (step 200). The wireless device 12 utilizes the DMTC(s) for the carrier frequency(ies) (step 202). The wireless device 12 may use the DMTC(s) to perform measurements such as RRM measurements on the asynchronous cells on the respective carrier frequency(ies) indicated in the SIB.

Below, examples of SIB3 and SIB5 including the async indication and DMTC configuration are provided. Note that, as discussed above, SIB3 and/or SIB5 may be further modified to include, for each downlink carrier frequency specified in the SIB3/SIB5, a separate DMTC configuration for synchronous cells on the downlink carrier frequency and, in some embodiments, a sync indication that, if set, indicates that there are synchronous cells on the downlink carrier frequency (and thus that the wireless device 12 should use the DMTC provided for synchronous cells to, e.g., perform RRM measurements). In the example below, portions related to DMTC and async indication are bolded and italicized.

The Information Element (IE) SystemInformationBlockType3 contains cell re-selection information common for intra-frequency, inter-frequency, and/or inter-Radio Access Technology (RAT) cell re-selection (i.e., applicable for more than one type of cell re-selection but not necessarily all) as well as intra-frequency cell re-selection information other than neighboring cell related information.

| SystemInformationBlockType3 information element |
| --- |

```
-- ASN1START
SystemInformationBlockType3 ::=          SEQUENCE {
    cellReselectionInfoCommon                SEQUENCE {
        q-Hyst                                   ENUMERATED {
                                                    dB0, dB1, dB2, dB3, dB4, dB5, dB6, dB8,
dB10,
                                                    dB12, dB14, dB16, dB18, dB20, dB22,
dB24},
        speedStateReselectionPars                SEQUENCE {
            mobilityStateParameters                  MobilityStateParameters,
            q-HystSF                                 SEQUENCE {
                sf-Medium                                ENUMERATED {
                                                            dB-6, dB-4, dB-2, dB0},
                sf-High                                  ENUMERATED {
                                                            dB-6, dB-4, dB-2, dB0}
            }
        }                                                                               OPTIONAL   -
- Need OP
    },
    cellReselectionServingFreqInfo           SEQUENCE {
        s-NonIntraSearch                         ReselectionThreshold                   OPTIONAL,  -
- Need OP
        threshServingLow                         ReselectionThreshold,
        cellReselectionPriority                  CellReselectionPriority
    },
    intraFreqCellReselectionInfo             SEQUENCE {
        q-RxLevMin                               Q-RxLevMin,
        p-Max                                    P-Max                                  OPTIONAL,  -
- Need OP
        s-IntraSearch                            ReselectionThreshold                   OPTIONAL,  -
- Need OP
        allowedMeasBandwidth                     AllowedMeasBandwidth                   OPTIONAL,  -
- Need OP
        presenceAntennaPort1                     PresenceAntennaPort1,
        neighCellConfig                          NeighCellConfig,
        t-ReselectionEUTRA                       T-Reselection,
        t-ReselectionEUTRA-SF                    SpeedStateScaleFactors                 OPTIONAL   -
- Need OP
    },
    ...,
    lateNonCriticalExtension                 OCTET STRING (CONTAINING
SystemInformationBlockType3-v10j0-IEs)   OPTIONAL,
    [[  s-IntraSearch-v920                       SEQUENCE {
            s-IntraSearchP-r9                        ReselectionThreshold,
            s-IntraSearchQ-r9                        ReselectionThresholdQ-r9
        }                                                                               OPTIONAL,  -
- Need OP
        s-NonIntraSearch-v920                    SEQUENCE {
            s-NonIntraSearchP-r9                     ReselectionThreshold,
            s-NonIntraSearchQ-r9                     ReselectionThresholdQ-r9
        }                                                                               OPTIONAL,  -
- Need OP
        q-QualMin-r9                             Q-QualMin-r9                           OPTIONAL,  -
- Need OP
        threshServingLowQ-r9                     ReselectionThresholdQ-r9               OPTIONAL   -
- Need OP
    ]],
    [[  q-QualMinWB-r11                          Q-QualMin-r9                           OPTIONAL   --
Cond WB-RSRQ
    ]],
    [[  q-QualMinRSRQ-OnAllSymbols-r12           Q-QualMin-r9                           OPTIONAL
-- Cond RSRQ
    ]],
    [[  cellReselectionServingFreqInfo-v1310  CellReselectionServingFreqInfo-v1310
                                              OPTIONAL,  -- Need OP
        redistributionServingInfo-r13            RedistributionServingInfo-r13 OPTIONAL, -
-Need OR
        cellSelectionInfoCE-r13                  CellSelectionInfoCE-r13                OPTIONAL,
-- Need OP
        t-ReselectionEUTRA-CE-r13                T-ReselectionEUTRA-CE-r13              OPTIONAL
-- Need OP
    ]],
```

| SystemInformationBlockType3 information element | | |
|---|---|---|
| *[[ intraFreqAsyncNeighCells-MF* -- Need OP | BOOLEAN | OPTIONAL, - |
| *intraFreqDMTC-MF* -- Need OP  -- Need OP | MeasDS-Config-MF | OPTIONAL, - |
| } |||
| RedistributionServingInfo-r13 ::= | SEQUENCE { ||
|     redistributionFactorServing-r13 | INTEGER(0..10), ||
|     redistributionFactorCell-r13 | ENUMERATED {true} | OPTIONAL,  -- Need OP |
|     t360-r13 | ENUMERATED {min4, min8, min16, min32, infinity, spare3,spare2,spare1}, ||
|     redistrOnPagingOnly-r13 | ENUMERATED {true} | OPTIONAL  --Need OP |
| } |||
| CellReselectionServingFreqInfo-v1310 ::= | SEQUENCE { ||
|     cellReselectionSubPriority-r13 | CellReselectionSubPriority-r13 ||
| } |||
| -- Late non critical extensions |||
| SystemInformationBlockType3-v10j0-IEs ::= SEQUENCE { |||
|     freqBandInfo-r10 | NS-PmaxList-r10 | OPTIONAL,  -- Need OR |
|     multiBandInfoList-v10j0 | MultiBandInfoList-v10j0 | OPTIONAL,  -- Need OR |
|     nonCriticalExtension | SEQUENCE { } | OPTIONAL |
| } |||
| -- ASN1STOP |||

| SystemInformationBlockType3 field descriptions |
|---|
| allowedMeasBandwidth |
| If absent, the value corresponding to the downlink bandwidth indicated by the dl-Bandwidth included in MasterInformationBlock applies. |
| cellSelectionInfoCE |
| Parameters included in coverage enhancement S criteria. They may be used by the UE to select/reselect a cell in which it works in CE mode on the concerned non serving frequency. If absent, the UE acquires the information from the target cell on the concerned frequency. |
| cellReselectionInfoCommon |
| Cell re-selection information common for cells. |
| cellReselectionServingFreqInfo |
| Information common for Cell re-selection to inter-frequency and inter-RAT cells. |
| freqBandInfo |
| A list of additionalPmax and additionalSpectrumEmission values as defined in TS 36.101 [42, table 6.2.4-1] applicable for the intra-frequency neighouring E-UTRA cells if the UE selects the frequency band from freqBandIndicator in SystemInformationBlockType1. |
| intraFreqAsyncNeighCells |
| Indicates whether the intra-frequency neighbor cells are unsynchronized with the PCell. If present, the UE shall perform intra-frequency discovery signals measurement according to the intraFreqDMTC. If intraFreqAsyncNeighCells is set to true, and intraFreqDMTC is not present, the UE performs intra-frequency discovery signals measurement on neighbour cells assuming any possible discovery signals timing. |
| intraFreqcellReselectionInfo |
| Cell re-selection information common for intra-frequency cells. |
| intraFreqDMTC |
| Indicates the discovery signals measurement timing configuration (DMTC) for intra-frequency neighbour cells. |
| multiBandInfoList-v10j0 |
| A list of additionalPmax and additionalSpectrumEmission values as defined in TS 36.101 [42, table 6.2.4-1] applicable for the intra-frequency neighouring E-UTRA cells if the UE selects the frequency bands in multiBandInfoList (i.e. without suffix) or multiBandInfoList-v9e0. |
| If E-UTRAN includes multiBandInfoList-v10j0, it includes the same number of entries, and listed in the same order, as in multiBandInfoList (i.e. without suffix). |
| p-Max |
| Value applicable for the intra-frequency neighbouring E-UTRA cells. If absent the UE applies the maximum power according to the UE capability. |
| redistrOnPagingOnly |
| If this field is present and the UE is redistribution capable, the UE shall only wait for the paging message to trigger E-UTRAN inter-frequency redistribution procedure as specified in 5.2.4.10 of 36.304[4]. |
| q-Hyst |
| Parameter $Q_{hyst}$ in 36.304 [4], Value in dB. Value dB1 corresponds to 1 dB, dB2 corresponds to 2 dB and so on. |
| q-HystSF |
| Parameter "Speed dependent ScalingFactor for $Q_{hyst}$" in TS 36.304 [4]. The sf-Medium and sf-High concern the additional hysteresis to be applied, in Medium and High Mobility state respectively, to $Q_{hyst}$ as defined in TS 36.304 [4]. In dB. Value dB-6 corresponds to −6 dB, dB-4 corresponds to −4 dB and so on. |
| q-QualMin |
| Parameter "$Q_{qualmin}$" in TS 36.304 [4], applicable for intra-frequency neighrbour cells. If the field is not present, the UE applies the (default) value of negative infinity for $Q_{qualmin}$. NOTE 1. |
| q-QualMinRSRQ-OnAllSymbols |
| If this field is present and supported by the UE, the UE shall, when performing RSRQ measurements, perform RSRQ measurement on all OFDM symbols in accordance with TS 36.214 [48]. NOTE 1. |
| q-QualMinWB |
| If this field is present and supported by the UE, the UE shall, when performing RSRQ measurements, use a wider bandwidth in accordance with TS 36.133 [16]. NOTE 1. |
| q-RxLevMin |
| Parameter "$Q_{rxlevmin}$" in TS 36.304 [4], applicable for intra-frequency neighbour cells. |

| SystemInformationBlockType3 field descriptions |
|---|
| redistributionFactorCell |
| If redistributionFactorCell is present, redistributionFactorServing is only applicable for the serving cell otherwise it is applicable for serving frequency redistributionFactorServing |
| Parameter redistributionFactorServing in TS 36.304 [4]. s-IntraSearch |
| Parameter "$S_{IntraSearchP}$" in TS 36.304 [4]. If the field s-IntraSearchP is present, the UE applies the value of s-IntraSearchP instead. Otherwise if neither s-IntraSearch nor s-IntraSearchP is present, the UE applies the (default) value of infinity for $S_{IntraSearchP}$. s-IntraSearchP |
| Parameter "$S_{IntraSearchP}$" in TS 36.304 [4]. See descriptions under s-IntraSearch. s-IntraSearchQ |
| Parameter "$S_{IntraSearchQ}$" in TS 36.304 [4]. If the field is not present, the UE applies the (default) value of 0 dB for $S_{IntraSearchQ}$. s-NonIntraSearch |
| Parameter "$S_{nonIntraSearchP}$" in TS 36.304 [4]. If the field s-NonIntraSearchP is present, the UE applies the value of s-NonIntraSearchP instead. Otherwise if neither s-NonIntraSearch nor s-NonIntraSearchP is present, the UE applies the (default) value of infinity for $S_{nonIntraSearchP}$. s-NonIntraSearchP |
| Parameter "$S_{nonIntraSearchP}$" in TS 36.304 [4]. See descriptions under s-NonIntraSearch. |

| SystemInformationBlockType3 field descriptions |
|---|
| s-NonIntraSearchQ |
| Parameter "$S_{nonIntraSearchQ}$" in TS 36.304 [4]. If the field is not present, the UE applies the (default) value of 0 dB for $S_{nonIntraSearchQ}$. speedStateReselectionPars |
| Speed dependent reselection parameters, see TS 36.304 [4]. If this field is absent, i.e, mobilityStateParameters is also not present, UE behaviour is specified in TS 36.304 [4]. t360 |
| Parameter "T360" in TS 36.304 [4]. threshServingLow |
| Parameter "$Thresh_{Serving, LowP}$" in TS 36.304 [4]. threshServingLowQ |
| Parameter "$Thresh_{Serving, LowQ}$" in TS 36.304 [4]. t-ReselectionEUTRA |
| Parameter "$Treselection_{EUTRA}$" in TS 36.304 [4]. t-ReselectionEUTRA-SF |
| Parameter "Speed dependent ScalingFactor for $Treselection_{EUTRA}$" in TS 36.304 [4]. If the field is not present, the UE behaviour is specified in TS 36.304 [4]. |

The IE SystemInformationBlockType5 contains information relevant only for inter-frequency cell re-selection, i.e. information about other Evolved Universal Terrestrial Radio Access (E-UTRA) frequencies and inter-frequency neighboring cells relevant for cell re-selection. The IE includes cell re-selection parameters common for a frequency as well as cell specific re-selection parameters.

| SystemInformationBlockType5 information element |
|---|
| ```
-- ASN1START
SystemInformationBlockType5 ::=        SEQUENCE {
    interFreqCarrierFreqList            InterFreqCarrierFreqList,
    ...,
    lateNonCriticalExtension            OCTET STRING (CONTAINING
SystemInformationBlockType5-v8h0-IEs)              OPTIONAL,
    [[  interFreqCarrierFreqList-v1250  InterFreqCarrierFreqList-v1250         OPTIONAL, -
- Need OR
        interFreqCarrierFreqListExt-r12 InterFreqCarrierFreqListExt-r12        OPTIONAL -
- Need OR
    ]],
    [[  interFreqCarrierFreqListExt-v1280   InterFreqCarrierFreqListExt-v1280  OPTIONAL
-- Need OR
    ]],
    [[  interFreqCarrierFreqList-v1310      InterFreqCarrierFreqList-v1310     OPTIONAL,
-- Need OR
        interFreqCarrierFreqListExt-v1310   InterFreqCarrierFreqListExt-v1310  OPTIONAL
-- Need OR
    ]]
}
SystemInformationBlockType5-v8h0-IEs ::=       SEQUENCE {
    interFreqCarrierFreqList-v8h0 SEQUENCE (SIZE (1..maxFreq)) OF
InterFreqCarrierFreqInfo-v8h0                OPTIONAL,   -- Need OP
        nonCriticalExtension            SystemInformationBlockType5-v9e0-IEs
            OPTIONAL
}
SystemInformationBlockType5-v9e0-IEs ::=       SEQUENCE {
    interFreqCarrierFreqList-v9e0 SEQUENCE (SIZE (1..maxFreq)) OF
InterFreqCarrierFreqInfo-v9e0                OPTIONAL,   -- Need OR
        nonCriticalExtension            SystemInformationBlockType5-v10j0-IEs        OPTIONAL
}
SystemInformationBlockType5-v10j0-IEs ::=      SEQUENCE {
    interFreqCarrierFreqList-v10j0 SEQUENCE (SIZE (1..maxFreq)) OF
InterFreqCarrierFreqInfo-v10j0               OPTIONAL,   -- Need OR
        nonCriticalExtension            SEQUENCE { }                         OPTIONAL
}
``` |

| SystemInformationBlockType5 information element |
| --- |

```
InterFreqCarrierFreqList ::=            SEQUENCE (SIZE (1..maxFreq)) OF
        InterFreqCarrierFreqInfo
InterFreqCarrierFreqList-v1250 ::=      SEQUENCE (SIZE (1.. maxFreq)) OF
        InterFreqCarrierFreqInfo-v1250
InterFreqCarrierFreqListExt-r12 ::=     SEQUENCE (SIZE (1.. maxFreq)) OF
        InterFreqCarrierFreqInfo-r12
InterFreqCarrierFreqListExt-v1280 ::=   SEQUENCE (SIZE (1.. maxFreq)) OF
        InterFreqCarrierFreqInfo-v10j0
InterFreqCarrierFreqList-v1310 ::=      SEQUENCE (SIZE (1.. maxFreq)) OF
        InterFreqCarrierFreqInfo-v1310
InterFreqCarrierFreqListExt-v1310 ::=   SEQUENCE (SIZE (1.. maxFreq) OF
        InterFreqCarrierFreqInfo-v1310
InterFreqCarrierFreqInfo ::=    SEQUENCE {
    dl-CarrierFreq                  ARFCN-ValueEUTRA,
    q-RxLevMin                      Q-RxLevMin,
    p-Max                           P-Max                       OPTIONAL, - - Need OP
    t-ReselectionEUTRA              T-Reselection,
    t-ReselectionEUTRA-SF           SpeedStateScaleFactors      OPTIONAL, - - Need OP
    threshX-High                    ReselectionThreshold,
    threshX-Low                     ReselectionThreshold,
    allowedMeasBandwidth            AllowedMeasBandwidth,
    presenceAntennaPort1            PresenceAntennaPort1,
    cellReselectionPriority         CellReselectionPriority     OPTIONAL, - - Need OP
    neighCellConfig                 NeighCellConfig,
    q-OffsetFreq                    Q-OffsetRange               DEFAULT dB0,
    interFreqNeighCellList          InterFreqNeighCellList      OPTIONAL, - - Need OR
    interFreqBlackCellList          InterFreqBlackCellList      OPTIONAL, - - Need OR
    ...,
    [[  q-QualMin-r9                Q-QualMin-r9                OPTIONAL, - - Need OP
        threshX-Q-r9                SEQUENCE {
            threshX-HighQ-r9            ReselectionThresholdQ-r9,
            threshX-LowQ-r9             ReselectionThresholdQ-r9
        }                                                       OPTIONAL - - Cond RSRQ
    ]],
    [[  q-QualMinWB-r11             Q-QualMin-r9                OPTIONAL --
Cond WB-RSRQ
    ]]
    [[ asyncNeighCells-MF           BOOLEAN                     OPTIONAL -
- Need OP
        neighborCellDMTC-MF         MeasDS-Config-MF            OPTIONAL -
- Need OP
    ]]
}
InterFreqCarrierFreqInfo-v8h0 ::=       SEQUENCE {
    multiBandInfoList               MultiBandInfoList           OPTIONAL -- Need OR
}
InterFreqCarrierFreqInfo-v9e0 ::=       SEQUENCE {
    dl-CarrierFreq-v9e0             ARFCN-ValueEUTRA-v9e0  OPTIONAL,   -- Cond dl-FreqMax
    multiBandInfoList-v9e0          MultiBandInfoList-v9e0     OPTIONAL,  -- Need OR
}
InterFreqCarrierFreqInfo-v10j0 ::=      SEQUENCE {
    freqBandInfo-r10                NS-PmaxList-r10             OPTIONAL,  -- Need OR
    multiBandInfoList-v10j0         MultiBandInfoList-v10j0     OPTIONAL   -- Need OR
}
InterFreqCarrierFreqInfo-v1250 ::=      SEQUENCE {
    reducedMeasPerformance-r12      ENUMERATED {true}           OPTIONAL,  -- Need OP
    q-QualMinRSRQ-OnAllSymbols-r12  Q-QualMin-r9                OPTIONAL   -- Cond RSRQ2
}
InterFreqCarrierFreqInfo-r12 ::=        SEQUENCE {
    dl-CarrierFreq-r12              ARFCN-ValueEUTRA-r9,
    q-RxLevMin-r12                  Q-RxLevMin,
    p-Max-r12                       P-Max                       OPTIONAL, - - Need OP
    t-ReselectionEUTRA-r12          T-Reselection,
    t-ReselectionEUTRA-SF-r12       SpeedStateScaleFactors      OPTIONAL, -
```

| SystemInformationBlockType5 information element |
|---|
| ```
                                                                                                      - Need OP
        threshX-High-r12                    ReselectionThreshold,
        threshX-Low-r12                     ReselectionThreshold,
        allowedMeasBandwidth-r12            AllowedMeasBandwidth,
        presenceAntennaPort1-r12            PresenceAntennaPort1,
        cellReselectionPriority-r12         CellReselectionPriority            OPTIONAL,  -
                                                                                                      - Need OP
        neighCellConfig-r12                 NeighCellConfig,
        q-OffsetFreq-r12                    Q-OffsetRange                      DEFAULT dB0,
        interFreqNeighCellList-r12          InterFreqNeighCellList             OPTIONAL,  -
- Need OR
        interFreqBlackCellList-r12          InterFreqBlackCellList             OPTIONAL,  -
- Need OR
        q-QualMin-r12                       Q-QualMin-r9                       OPTIONAL,  -
- Need OP
        threshX-Q-r12                       SEQUENCE {
            threshX-HighQ-r12                   ReselectionThresholdQ-r9,
            threshX-LowQ-r12                    ReselectionThresholdQ-r9
        }                                                                      OPTIONAL,  --
Cond RSRQ
        q-QualMinWB-r12                     Q-QualMin-r9                       OPTIONAL,  --
Cond WB-RSRQ
        multiBandInfoList-r12               MultiBandInfoList-r11              OPTIONAL,  --
Need OR
        reducedMeasPerformance-r12          ENUMERATED {true}                  OPTIONAL,  --
Need OP
        q-QualMinRSRQ-OnAllSymbols-r12      Q-QualMin-r9                       OPTIONAL,  --
Cond RSRQ2
    ...
}
InterFreqCarrierFreqInfo-v1310 ::=          SEQUENCE {
        cellReselectionSubPriority-r13          CellReselectionSubPriority-r13     OPTIONAL,
-- Need OP
        redistributionInterFreqInfo-r13         RedistributionInterFreqInfo-r13    OPTIONAL,  --
Need OP
        cellSelectionInfoCE-r13                 CellSelectionInfoCE-r13            OPTIONAL,  --
Need OP
        t-ReselectionEUTRA-CE-r13               T-ReSelectionEUTRA-CE-r13          OPTIONAL   --
Need OP
}
InterFreqNeighCellList ::=                  SEQUENCE (SIZE (1..maxCellInter)) OF
InterFreqNeighCellInfo
InterFreqNeighCellInfo ::=                  SEQUENCE {
        physCellId                              PhysCellId,
        q-OffsetCell                            Q-OffsetRange
}
InterFreqBlackCellList ::=                  SEQUENCE (SIZE (1..maxCellBlack)) OF PhysCellIdRange
RedistributionInterFreqInfo-r13 ::=         SEQUENCE {
        redistributionFactorFreq-r13            RedistributionFactor-r13           OPTIONAL,  --
Need OP
        redistributionNeighCellList-r13         RedistributionNeighCellList-r13    OPTIONAL
--Need OP
}
RedistributionNeighCellList-r13 ::=         SEQUENCE (SIZE (1..maxCellInter)) OF
                                                RedistributionNeighCell-r13
RedistributionNeighCell-r13 ::=             SEQUENCE {
        physCellId-r13                          PhysCellId,
        redistributionFactorCell-r13            RedistributionFactor-r13
}
RedistributionFactor-r13 ::= INTEGER(1..10)
-- ASN1STOP
``` |

| SystemInformationBlockType5 field descriptions |
|---|
| asyncNeighCells |
| Indicates whether the neighbor cells on the carrier frequency indicated by dl-CarrierFreq are unsynchronized with the PCell. If present, the UE performs discovery signals measurement on the carrier frequency indicated by dl-CarrierFreq according to the measDS-Config. If set to true, and measDS-Config is not present, the UE performs discovery signals measurement on the carrier frequency indicated by dl-CarrierFreq assuming any possible discovery signals timing, |

| SystemInformationBlockType5 field descriptions |
|---|
| freqBandInfo |
| A list of additionalPmax and additionalSpectrumEmission values as defined in TS 36.101 [42, table 6.2.4-1] for the frequency band represented by dl-CarrierFreq for which cell reselection parameters are common. |
| interFreqBlackCellList |
| List of blacklisted inter-frequency neighbouring cells. |

| SystemInformationBlockType5 field descriptions |
|---|
| interFreqCarrierFreqList |
| List of neighbouring inter-frequencies. E-UTRAN does not configure more than one entry for the same physical frequency regardless of the E-ARFCN used to indicate this. If E-UTRAN includes interFreqCarrierFreqList-v8h0, interFreqCarrierFreqList-v9e0, InterFreqCarrierFreqList-v1250 and/or InterFreqCarrierFreqList-v1310, it includes the same number of entries, and listed in the same order, as in interFreqCarrierFreqList (i.e. without suffix). See Annex D for more descriptions. |
| interFreqCarrierFreqListExt |
| List of additional neighbouring inter-frequencies, i.e. extending the size of the inter-frequency carrier list using the general principles specified in 5.1.2. E-UTRAN does not configure more than one entry for the same physical frequency regardless of the E-ARFCN used to indicate this. EUTRAN may include interFreqCarrierFreqListExt even if interFreqCarrierFreqList (i.e without suffix) does not include maxFreq entries. If E-UTRAN includes InterFreqCarrierFreqListExt-v1310 it includes the same number of entries, and listed in the same order, as in interFreqCarrierFreqListExt-r12. |
| interFreqNeighCellList |
| List of inter-frequency neighbouring cells with specific cell re-selection parameters. |
| multiBandInfoList |
| Indicates the list of frequency bands in addition to the band represented by dl-CarrierFreq for which cell reselection parameters are common. E-UTRAN indicates at most maxMultiBands frequency bands (i.e. the total number of entries across both multiBandInfoList and multiBandInfoList-v9e0 is below this limit). |
| multiBandInfoList-v10j0 |
| A list of additionalPmax and additionalSpectrumEmission values as defined in TS 36.101 [42, table 6.2.4-1] for the frequency bands in multiBandInfoList (i.e. without suffix) and multiBandInfoList-v9e0. If E-UTRAN includes multiBandInfoList-v10j0, it includes the same number of entries, and listed in the same order, as in multiBandInfoList (i.e. without suffix). |
| neighCellDMTC-Config |
| Parameters applicable to discovery signals measurement on the carrier frequency indicated by dl-CarrierFreq. |
| p-Max |
| Value applicable for the neighbouring E-UTRA cells on this carrier frequency. If absent the UE applies the maximum power according to the UE capability. |
| q-OffsetCell |
| Parameter "Qoffset$_{s, n}$" in TS 36.304 [4]. |
| q-OffsetFreq |
| Parameter "Qoffset$_{frequency}$" in TS 36.304 [4]. |
| q-QualMin |
| Parameter "Q$_{qualmin}$" in TS 36.304 [4]. If the field is not present, the UE applies the (default) value of negative infinity for Q$_{qualmin}$. NOTE 1. |
| q-QualMinRSRQ-OnAllSymbols |
| If this field is present and supported by the UE, the UE shall, when performing RSRQ measurements, perform RSRQ measurement on all OFDM symbols in accordance with TS 36.214 [48]. NOTE 1. |
| q-QualMinWB |
| If this field is present and supported by the UE, the UE shall, when performing RSRQ measurements, use a wider bandwidth in accordance with TS 36.133 [16]. NOTE 1. |
| redistributionFactorFreq |
| Parameter redistributionFactorFreq in TS 36.304 [4]. |

| SystemInformationBlockType5 field descriptions |
|---|
| redistributionFactorCell |
| Parameter redistributionFactorCell in TS 36.304 [4]. |
| reducedMeasPerformance |
| Value TRUE indicates that the neighbouring inter-frequency is configured for reduced measurement performance, see TS 36.133 [16]. If the field is not included, the neighbouring inter-frequency is configured for normal measurement performance, see TS 36.133 [16]. |
| threshX-High |
| Parameter "Thresh$_{X, HighP}$" in TS 36.304 [4]. |
| threshX-HighQ |
| Parameter "Thresh$_{X, HighQ}$" in TS 36.304 [4]. |
| threshX-Low |
| Parameter "Thresh$_{X, LowP}$" in TS 36.304 [4]. |
| threshX-LowQ |
| Parameter "Thresh$_{X, LowQ}$" in TS 36.304 [4]. |
| t-ReselectionEUTRA |
| Parameter "Treselection$_{EUTRA}$" in TS 36.304 [4]. |
| t-ReselectionEUTRA-SF |
| Parameter "Speed dependent ScalingFactor for Treselection$_{EUTRA}$" in TS 36.304 [4]. If the field is not present, the UE behaviour is specified in TS 36.304 [4]. |

Figure 11:
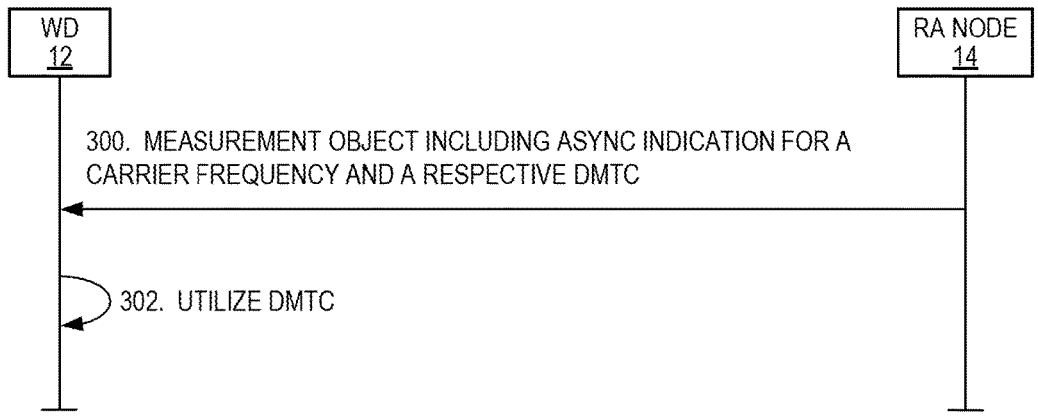
FIG. 11 illustrates a process by which a DMTC for asynchronous neighboring cells is provided to a wireless device in a measurement object according to some embodiments of the present disclosure.

FIG. 11 illustrates the operation of the radio access node 14 and the wireless device 12 according to some embodiments of the present disclosure in which a DMTC is provided to the wireless device 12 for a carrier frequency together with a respective async indication within a measurement object used to configure the wireless device 12 to perform measurements on the carrier frequency. As illustrated, the radio access node 14 sends a measurement object to the wireless device 12 where the measurement object includes: (a) an async indication for a respective carrier frequency and (b) a DMTC for the carrier frequency to be used if the async indication for the downlink carrier frequency is set to a value that indicates that one or more asynchronous cells are operating on the downlink carrier frequency (i.e., indicates that there are asynchronous cell(s) on the downlink carrier frequency) (step 300). The wireless device 12 utilizes the DMTC for the carrier frequency (step 302). The wireless device 12 may use the DMTC to perform measurements such as RRM measurements on the asynchronous cells on the carrier frequency indicated in the measurement object.

Below, an example of a measurement object, namely MeasObjectEUTRA, including the async indication and DMTC configuration for a specified carrier frequency are provided below. Note that, as discussed above, the measurement object may be further modified to include a separate DMTC configuration for synchronous cells on the specified carrier frequency and, in some embodiments, a sync indication that, if set, indicates that there are synchronous cells on the specified carrier frequency (and thus that the wireless device 12 should use the DMTC provided for synchronous cells when performing measurements on the specified carrier frequency). In the example below, portions related to DMTC and async indication are bolded and italicized.

The IE MeasObjectEUTRA specifies information applicable for intra-frequency or inter-frequency E-UTRA cells.

| MeasObjectEUTRA information element |
| --- |

```
-- ASN1START
MeasObjectEUTRA ::=            SEQUENCE {
    carrierFreq                    ARFCN-ValueEUTRA,
    allowedMeasBandwidth           AllowedMeasBandwidth,
    presenceAntennaPort1           PresenceAntennaPort1,
    neighCellConfig                NeighCellConfig,
    offsetFreq                     Q-OffsetRange              DEFAULT dB0,
    -- Cell list
    cellsToRemoveList              CellIndexList              OPTIONAL, -- Need ON
    cellsToAddModList              CellsToAddModList          OPTIONAL, -- Need ON
    -- Black list
    blackCellsToRemoveList         CellIndexList              OPTIONAL, -- Need ON
    blackCellsToAddModList         BlackCellsToAddModList     OPTIONAL, -- Need ON
    cellForWhichToReportCGI        PhysCellId                 OPTIONAL, -- Need ON
    ...,
    [[ measCycleSCell-r10          MeasCycleSCell-r10         OPTIONAL, -- Need ON
       measSubframePatternConfigNeigh-r10   MeasSubframePatternConfigNeigh-r10   OPTIONAL
    ]],
    [[ widebandRSRQ-Meas-r11       BOOLEAN OPTIONAL           -- Cond WB-RSRQ
    ]],
    [[ altTTT-CellsToRemoveList-r12    CellIndexList          OPTIONAL, -- Need ON
       altTTT-CellsToAddModList-r12    AltTTT-CellsToAddModList-r12   OPTIONAL, -- Need ON
       t312-r12                    CHOICE {
           release                     NULL,
           setup                       ENUMERATED {ms0, ms50, ms100, ms200,
                                           ms300, ms400, ms500, ms1000}
       }                                                      OPTIONAL, -- Need ON
       reducedMeasPerformance-r12  BOOLEAN                    OPTIONAL, -- Need ON
       measDS-Config-r12           MeasDS-Config-r12          OPTIONAL  -- Need ON
    ]],
    [[
       whiteCellsToRemoveList-r13  CellIndexList              OPTIONAL, -- Need ON
       whiteCellsToAddModList-r13  WhiteCellsToAddModList-r13 OPTIONAL, -- Need ON
       rmtc-Config-r13             RMTC-Config-r13            OPTIONAL, -- Need ON
       carrierFreq-r13             ARFCN-ValueEUTRA-v9e0      OPTIONAL, -- Need ON
    ]],
    //
       asyncNeighCells-MF          BOOLEAN                    OPTIONAL, -- Need ON
       measDS-Config-MF            MeasDS-Config-MF           OPTIONAL, -- Need ON
    //
}
MeasObjectEUTRA-v9e0 ::=        SEQUENCE {
    carrierFreq-v9e0               ARFCN-ValueEUTRA-v9e0
}
CellsToAddModList ::=           SEQUENCE (SIZE (1..maxCellMeas)) OF CellsToAddMod
CellsToAddMod ::=   SEQUENCE {
    cellIndex                      INTEGER (1..maxCellMeas),
    physCellId                     PhysCellId,
    cellIndividualOffset           Q-OffsetRange
}
BlackCellsToAddModList ::=      SEQUENCE (SIZE (1..maxCellMeas)) OF BlackCellsToAddMod
BlackCellsToAddMod ::= SEQUENCE {
    cellIndex                      INTEGER (1..maxCellMeas),
    physCellIdRange                PhysCellIdRange
}
MeasCycleSCell-r10 ::=          ENUMERATED {sf160, sf256, sf320, sf512,
                                    sf640, sf1024, sf1280, spare1}
MeasSubframePatternConfigNeigh-r10 ::=   CHOICE {
    release                        NULL,
    setup                          SEQUENCE {
        measSubframePatternNeigh-r10    MeasSubframePattern-r10,
```

| MeasObjectEUTRA information element |
| --- |
| ```
        measSubframeCellList-r10               MeasSubframeCellList-r10   OPTIONAL   -
- Cond always
    }
}
MeasSubframeCellList-r10 ::=  SEQUENCE (SIZE (1..maxCellMeas)) OF PhysCellIdRange
AltTTT-CellsToAddModList-r12 ::=         SEQUENCE (SIZE (1..maxCellMeas)) OF AltTTT-
CellsToAddMod-r12
AltTTT-CellsToAddMod-r12 ::=  SEQUENCE {
    cellIndex-r12                          INTEGER (1..maxCellMeas),
    physCellIdRange-r12                    PhysCellIdRange
}
WhiteCellsToAddModList-r13 ::=             SEQUENCE (SIZE (1..maxCellMeas)) OF
WhiteCellsToAddMod-r13
WhiteCellsToAddMod-r13 ::= SEQUENCE {
    cellIndex-r13                          INTEGER (1..maxCellMeas),
    physCellIdRange-r13                    PhysCellIdRange
}
RMTC-Config-r13 ::= CHOICE {
    release                                NULL,
    setup                                  SEQUENCE {
        rmtc-Period-r13                    ENUMERATED {ms40, ms80, ms160, ms320, ms640},
        rmtc-SubframeOffset-r13            INTEGER(0..639)           OPTIONAL,   -
- Need ON
        measDuration-r13                   ENUMERATED {sym1, sym14, sym28, sym42, sym70},
        . . .
    }
}
-- ASN1STOP
``` |

| MeasObjectEUTRA field descriptions |
| --- |
| altTTT-CellsToAddModList |
| List of cells to add/modify in the cell list for which the alternative time to trigger specified by alternativeTimeToTrigger in reportConfigEUTRA, if configured, applies. |
| altTTT-CellsToRemoveList |
| List of cells to remove from the list of cells for alternative time to trigger. |
| asyncNeighCells |
| Indicates whether the neighbor cells on the carrier frequency indicated by carrierFreq are unsynchronized with the PCell. If present, the UE shall perform discovery signals measurement on the carrier frequency indicated by carrierFreq according to the measDS-Config. If set to true, and measDS-Config is not present, the UE shall perform discovery signals measurement on the carrier frequency indicated by carrierFreq assuming any possible discovery signals timing. |
| blackCellsToAddModList |
| List of cells to add/modify in the black list of cells. |
| blackCellsToRemoveList |
| List of cells to remove from the black list of cells. |
| carrierFreq |
| Identifies E-UTRA carrier frequency for which this configuration is valid. E-UTRAN does not configure more than one measurement object for the same physical frequency regardless of the E-ARFCN used to indicate this. CarrierFreq-r13 is included only when the extension list measObjectToAddModListExt-r13 is used. If carrierFreq-r13 is present, carrierFreq (i.e., without suffix) shall be set to value maxEARFCN. |
| cellIndex |
| Entry index in the cell list. An entry may concern a range of cells, in which case this value applies to the entire range. |
| cellIndividualOffset |
| Cell individual offset applicable to a specific cell. Value dB-24 corresponds to −24 dB, dB-22 corresponds to −22 dB and so on. |
| cellsToAddModList |
| List of cells to add/modify in the cell list. |

| MeasObjectEUTRA field descriptions |
| --- |
| cellsToRemoveList |
| List of cells to remove from the cell list. |
| measCycleSCell |
| The parameter is used only when an SCell is configured on the frequency indicated by the measObject and is in deactivated state, see TS 36.133 [16, 8.3.3]. E-UTRAN configures the parameter whenever an SCell is configured on the frequency indicated by the measObject, but the field may also be signalled when an SCell is not configured. Value sf160 corresponds to 160 sub-frames, sf256 corresponds to 256 sub-frames and so on. |
| measDS-Config |
| Parameters applicable to discovery signals measurement on the carrier frequency indicated by carrierFreq. |
| measDuration |
| Number of consecutive symbols for which the Physical Layer reports samples of RSSI, see TS 36.214 [48]. Value sym1 corresponds to one symbol, sym14 corresponds to 14 symbols, and so on. |
| measSubframeCellList |
| List of cells for which measSubframePatternNeigh is applied. |
| measSubframePatternNeigh |
| Time domain measurement resource restriction pattern applicable to neighbour cell RSRP and RSRQ measurements on the carrier frequency indicated by carrierFreq. For cells in measSubframeCellList the UE shall assume that the subframes indicated by measSubframePatternNeigh are non-MBSFN subframes, and have the same special subframe configuration as PCell. |
| offsetFreq |
| Offset value applicable to the carrier frequency. Value dB-24 corresponds to −24 dB, dB-22 corresponds to −22 dB and so on. |
| physCellId |
| Physical cell identity of a cell in the cell list. |
| physCellIdRange |
| Physical cell identity or a range of physical cell identities. |

| MeasObjectEUTRA field descriptions |
|---|
| reducedMeasPerformance |
| If set to TRUE, the EUTRA carrier frequency is configured for reduced measurement performance, otherwise it is configured for normal measurement performance, see TS 36.133 [16]. |
| rmtc-Config |
| Parameters applicable to RSSI and channel occupancy measurement on the carrier frequency indicated by carrierFreq. |
| rmtc-Period |
| Indicates the RSSI measurement timing configuration (RMTC) periodicity for this frequency. Value ms40 corresponds to 40 ms periodicity, ms80 corresponds to 80 ms periodicity and so on, see TS 36.214 [48]. |
| rmtc-SubframeOffset |
| Indicates the RSSI measurement timing configuration (RMTC) subframe offset for this frequency. The value of rmtc-SubframeOffset should be smaller than the value of rmtc-Period, see TS 36.214 [48]. For inter-frequency measurements, this field is optional present and if it is not configured, the UE chooses a random value as rmtc-SubframeOffset for measDuration which shall be selected to be between 0 and the configured rmtc-Period with equal probability. |
| t312 |
| The value of timer T312. Value ms 0 represents 0 ms, ms 50 represents 50 ms and so on. |
| widebandRSRQ-Meas |
| If this field is set to TRUE, the UE shall, when performing RSRQ measurements, use a wider bandwidth in accordance with TS 36.133 [16]. |
| whiteCellsToAddModList |
| List of cells to add/modify in the white list of cells. |
| whiteCellsToRemoveList |
| List of cells to remove from the white list of cells. |

Below is an example of MeasDS-Config which is used in the examples above. The IE MeasDS-Config specifies information applicable for discovery signals measurement.

MeasDS-Config information elements

```
-- ASN1START
MeasDS-Config-r12 ::=              CHOICE {
    release                            NULL,
    setup                              SEQUENCE {
        dmtc-PeriodOffset-r12              CHOICE {
            ms40-r12                           INTEGER(0..39),
            ms80-r12                           INTEGER(0..79),
            ms160-r12                          INTEGER(0..159),
            ...
        },
        ds-OccasionDuration-r12            CHOICE {
            durationFDD-r12                    INTEGER(1..maxDS-Duration-r12),
            durationTDD-r12                    INTEGER(2..maxDS-Duration-r12)
        },
        measCSI-RS-ToRemoveList-r12 MeasCSI-RS-ToRemoveList-r12 OPTIONAL,    -- Need ON
        measCSI-RS-ToAddModList-r12 MeasCSI-RS-ToAddModList-r12 OPTIONAL,    -- Need ON
        ...
    }
}
MeasDS-Config-MF ::=               CHOICE {
    release                            NULL,
    setup                              SEQUENCE {
        dmtc-Period-MF                     ENUMERATED {ms40, ms80, ms160},
        dmtc-Offet-MF                      INTEGER(0..159),
        dmtc-Duration-MF                   INTEGER(1..10),
        measCSI-RS-ToRemoveList-MF         MeasCSI-RS-ToRemoveList-r12 OPTIONAL,    -- Need ON
        measCSI-RS-ToAddModList-MF         MeasCSI-RS-ToAddModList-r12 OPTIONAL,    -- Need ON
        ...
    }
}
MeasCSI-RS-ToRemoveList-r12 ::=    SEQUENCE (SIZE (1..maxCSI-RS-Meas-r12)) OF MeasCSI-RS-Id-r12
MeasCSI-RS-ToAddModList-r12 ::=    SEQUENCE (SIZE (1..maxCSI-RS-Meas-r12)) OF MeasCSI-RS-Config-r12
MeasCSI-RS-Id-r12 ::=              INTEGER (1..maxCSI-RS-Meas-r12)
MeasCSI-RS-Config-r12 ::=          SEQUENCE {
    measCSI-RS-Id-r12                  MeasCSI-RS-Id-r12,
    physCellId-r12                     INTEGER (0..503),
    scramblingIdentity-r12             INTEGER (0..503),
    resourceConfig-r12                 INTEGER (0..31),
    subframeOffset-r12                 INTEGER (0..4),
    csi-RS-IndividualOffset-r12        Q-OffsetRange,
    ...
}
-- ASN1STOP
```

| MeasDS-Config field descriptions |
| --- |
| csi-RS-IndividualOffset |
| CSI-RS individual offset applicable to a specific CSI-RS resource. Value dB-24 corresponds to −24 dB, dB-22 corresponds to −22 dB and so on. |
| dmtc-Duration |
| Indicates the duration in number of subframes during which the UE shall expect discovery signals. |
| dmtc-Period |
| Indicates the discovery signals measurement timing configuration (DMTC) periodicity (dmtc-Periodicity). Value ms40 corresponds to 40 ms, ms80 corresponds to 80 ms and so on. |
| dmtc-Offset |
| Indicates the discovery signals measurement timing configuration (DMTC) offset (dmtc-Offset). The value of DMTC offset is in number of subframe(s). |
| dmtc-PeriodOffset |
| Indicates the discovery signals measurement timing configuration (DMTC) periodicity (dmtc-Periodicity) and offset (dmtc-Offset) for this frequency. For DMTC periodicity, value ms40 corresponds to 40 ms, ms80 corresponds to 80 ms and so on. The value of DMTC offset is in number of subframe(s). The duration of a DMTC occasion is 6 ms. |
| ds-OccasionDuration |
| Indicates the duration of discovery signal occasion for this frequency. Discovery signal occasion duration is common for all cells transmitting discovery signals on one frequency. The UE shall ignore the field ds-OccasionDuration for a carrier frequency with a configured LAA SCell and apply a value 1 instead. |
| measCSI-RS-ToAddModList |
| List of CSI-RS resources to add/modify in the CSI-RS resource list for discovery signals measurement. |
| measCSI-RS-ToRemoveList |
| List of CSI-RS resources to remove from the CSI-RS resource list for discovery signals measurement. |
| physCellId |
| Indicates the physical cell identity where UE may assume that the CSI-RS and the PSS/SSS/CRS corresponding to the indicated physical cell identity are quasi co-located with respect to average delay and doppler shift. |
| resourceConfig |
| Parameter: CSI reference signal configuration, see TS 36.211 [21, table 6.10.5.2-1 and 6.10.5.2-2]. For a carrier frequency with a configured LAA SCell, E-UTRAN does not configure the values {0, 4, 5, 9, 10, 11, 18, 19}. |
| scramblingIdentity |
| Parameter: Pseudo-random sequence generator parameter, $n_{ID}$, see TS 36.213 [23, 7.2.5]. |
| subframeOffset |
| Indicates the subframe offset between SSS of the cell indicated by physCellId and the CSI-RS resource in a discovery signal occasion. The field subframeOffset is set to values 0 for a carrier frequency with a configured LAA SCell. |

In some embodiments, the wireless device 12 sets up the DMTC in accordance with the received dmtc-PeriodOffset or dmtc-Period-MF and dmtc-Offset-MF, respectively, i.e., the first subframe of each DMTC occasion occurs at a System Frame Number (SFN) and subframe of the PCell meeting the following condition:

SFN mod $T$=FLOOR(dmtc-Offset/10);

subframe=dmtc-Offset mod 10;

with $T$=dmtc-Periodicity/10;

On the concerned frequency, the wireless device 12 considers DRS transmission in subframes outside the DMTC occasion.

Figure 12:
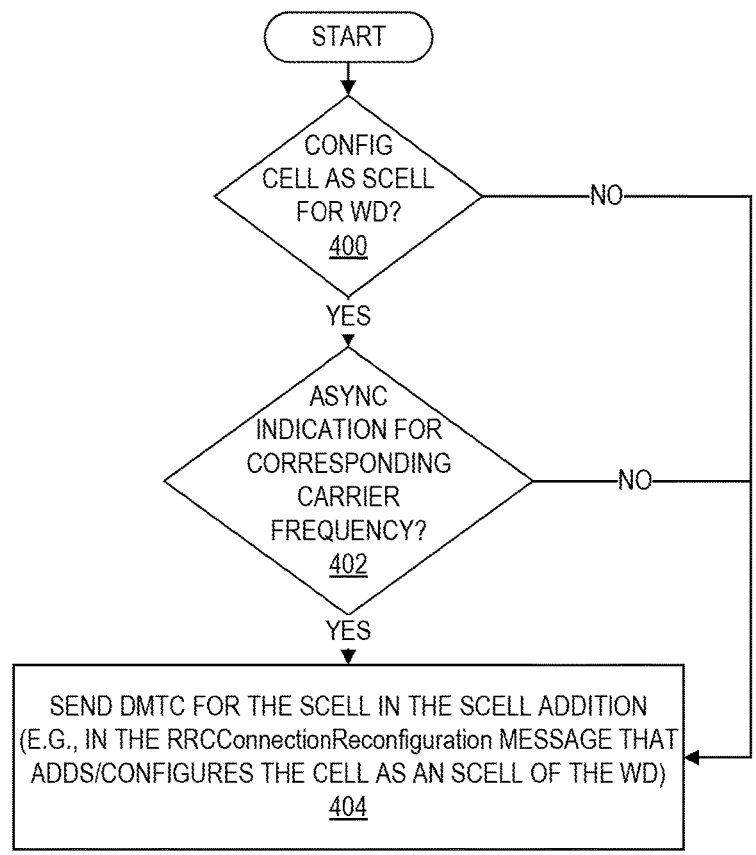
FIG. 12 is a flow chart that illustrates the operation of a radio access node according to some embodiments of the present disclosure.

In certain embodiments according to option 3, as illustrated in FIG. 12, a method in an eNB (e.g., a method in a radio access node 14) comprises determining whether to configure a SCell (step 400); in response to determining to configure the SCell, determining whether the async indication is provided for the corresponding frequency (step 402); and in response to determining that the async indication is provided for the corresponding frequency, sending the SCell's DMTC configuration in the SCell addition (step 404). The SCell addition may be provided via an RRCConnectionReconfiguration message, as described above.

Thus, in some embodiments, a method in a radio access node 14 for informing a wireless communication device 12 about the discovery signal timing, during which a wireless communication device is required to search for SCell discovery signals apart from the timing received via system information for other network nodes, comprises: determining a SCell for configuration; determining whether the neighbor cells on the SCell frequency are asynchronous; and indicating to the device the exact DMTC for the SCell via dedicated signaling.

Figure 13:
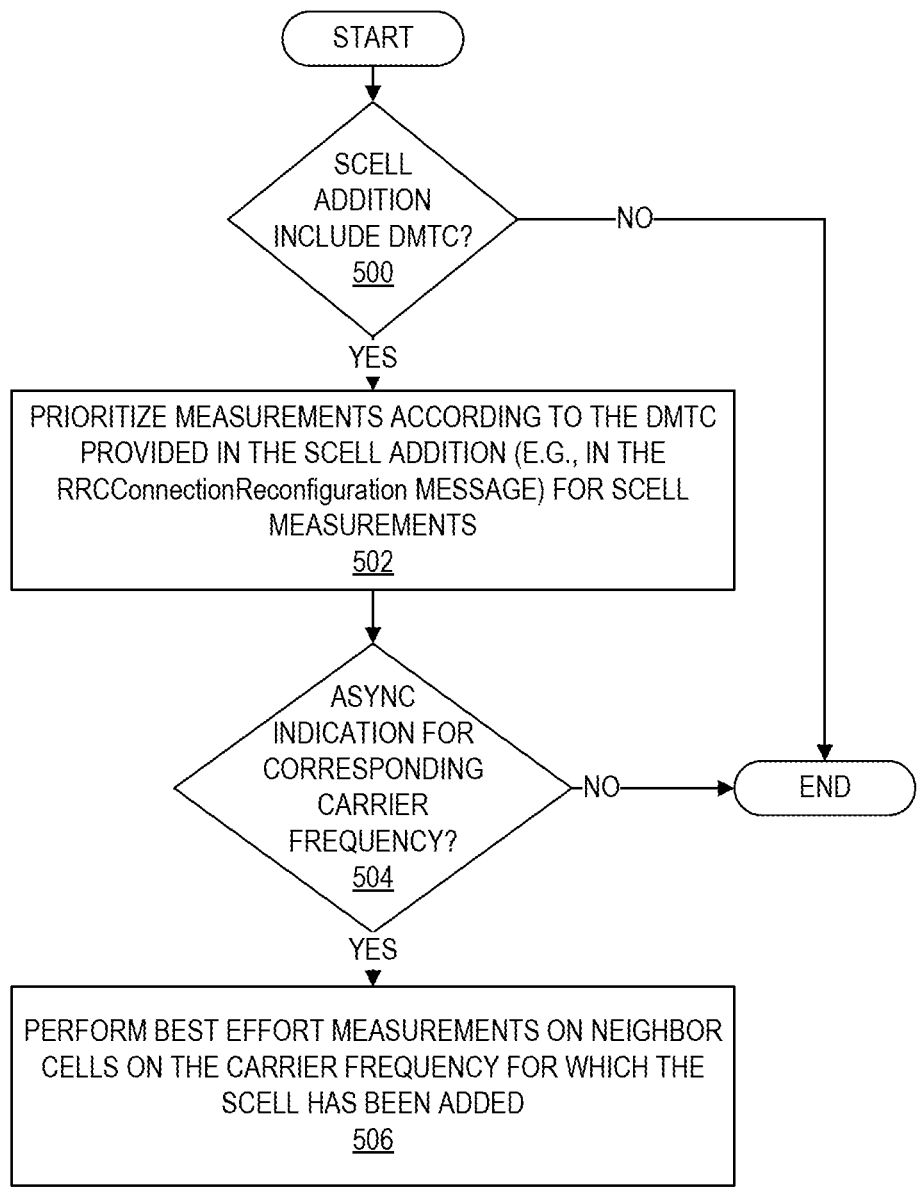
FIGS. 13 and 14 are flow charts that illustrate the operation of a wireless device according to some embodiments of the present disclosure.

In certain embodiments according to option 3, as illustrated in FIG. 13, a method in a UE (e.g., the wireless device 12) comprises determining whether the SCell addition includes DMTC configuration for the SCell (step 500); in response to determining that the SCell addition includes DMTC configuration for the SCell, (a) prioritizing measurements according to the DMTC configuration provided via dedicated signaling for SCell measurements (step 502); and (b) if the async bit is set to a value that indicates that one or more asynchronous cells are operating on the frequency (step 504; YES), performing best effort measurements on the neighbor cells on the frequency where the SCell has been added (step 506). The method may use inter-frequency DMTC provided via system information to minimize its battery consumption during RRM measurements. The inter-frequency DMTC may be provided on SIB5, for example. Note that the UE may prioritize measurements by, for example, performing those measurements more frequently. Another example could be that, if the UE can only process a limited number of cells, the UE prioritizes the cells found in the prioritized DMTC. Further note that performing best effort measurements means that there are no requirements for how quickly the UE needs to find a report these cells and that it can choose not to search to, e.g., save battery.

Thus, in some embodiments, a method in a wireless communication device 12 comprises: determining whether the DMTC configuration is present in the SCell addition; configuring and prioritizing the DMTC for discovery signal measurements for the SCell; performing measurements for the SCell; and attempting to detect the discovery signals from neighbor cells on the SCell frequency and performing measurements on neighbor cells on the SCell frequency when possible.

Figure 14:
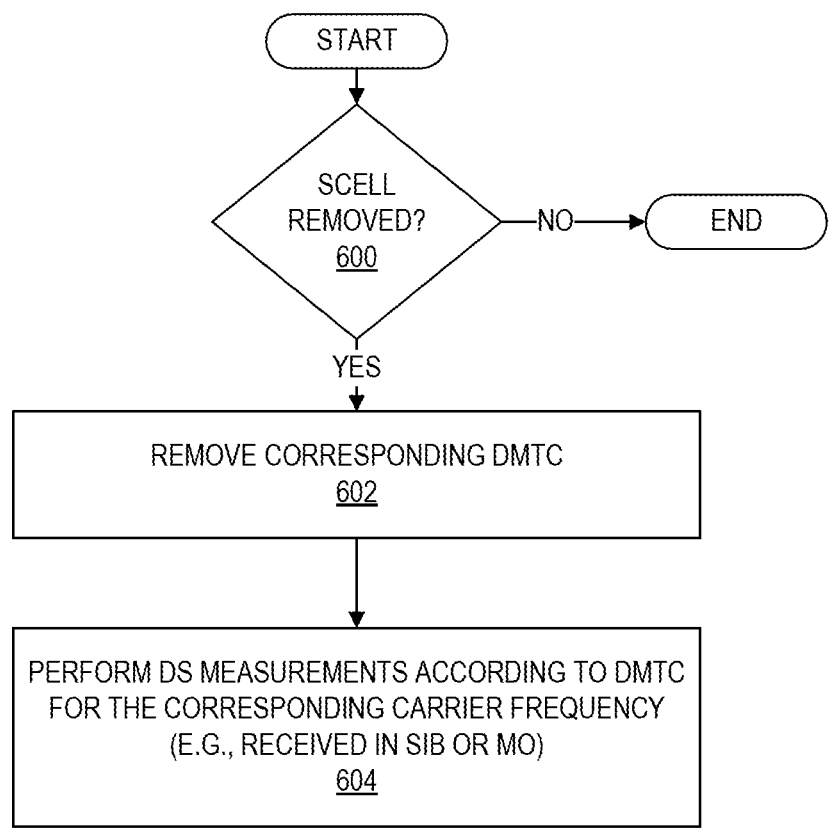

As illustrated in FIG. 14, the method may further comprise, if the SCell configuration is removed (step 600, YES), deleting (i.e., removing) the DMTC configuration for the SCell (step 602) and performing discovery signal measurements according to the DMTC configuration in, e.g., SIB5 (step 604).

Figure 15:
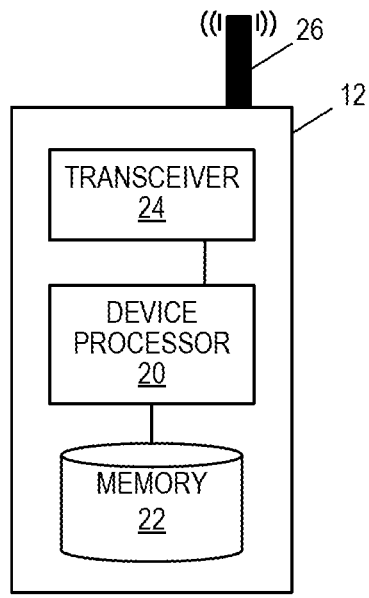
FIGS. 15 and 16 are block diagram of some embodiments of a wireless device.
Figure 16:
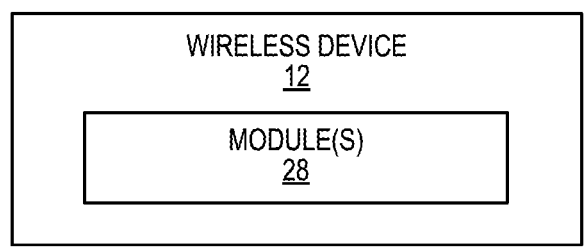

Although wireless communication devices 12 may represent communication devices that include any suitable combination of hardware and/or software, these wireless communication devices may, in certain embodiments, represent devices such as an example wireless communication device 12 illustrated in greater detail by FIGS. 15 and 16. Similarly, although the illustrated radio access node 14 may represent network nodes that include any suitable combination of hardware and/or software, these nodes may, in particular embodiments, represent devices such as the example radio access node 14 illustrated in greater detail by FIGS. 17 through 19.

Referring to FIG. 15, the wireless communication device 12 comprises a processor 20 (e.g., a Central Processing Unit(s) (CPU(s)), Application Specific Integrated Circuit(s) (ASIC(s)), Field Programmable Gate Array(s) (FPGA(s)), and/or the like), a memory 22, a transceiver 24, and an antenna 26. In certain embodiments, some or all of the functionality described as being provided by UEs, MTC or M2M devices, and/or any other types of wireless communication devices may be provided by the processor 20 executing instructions stored on a computer readable medium, such as the memory 22 shown in FIG. 15. Alternative embodiments may include additional components beyond those shown in FIG. 15 that may be responsible for providing certain aspects of the wireless communication device's functionality, including any of the functionality described herein.

FIG. 16 illustrates the wireless communication device 12 according to some other embodiments of the present disclosure. As illustrated, the wireless communication device 12 includes one or more modules 28, each of which is implemented in software. The module(s) 28 operate to perform the functions of the wireless communication device 12 (e.g., UE, M2M UE, MTC UE, or the like) described herein. For example, the module(s) 28 may include a receiving module operable to receive a DMTC configuration as described herein and a utilizing module operable to utilize the DMTC configuration as described herein.

Figure 17:
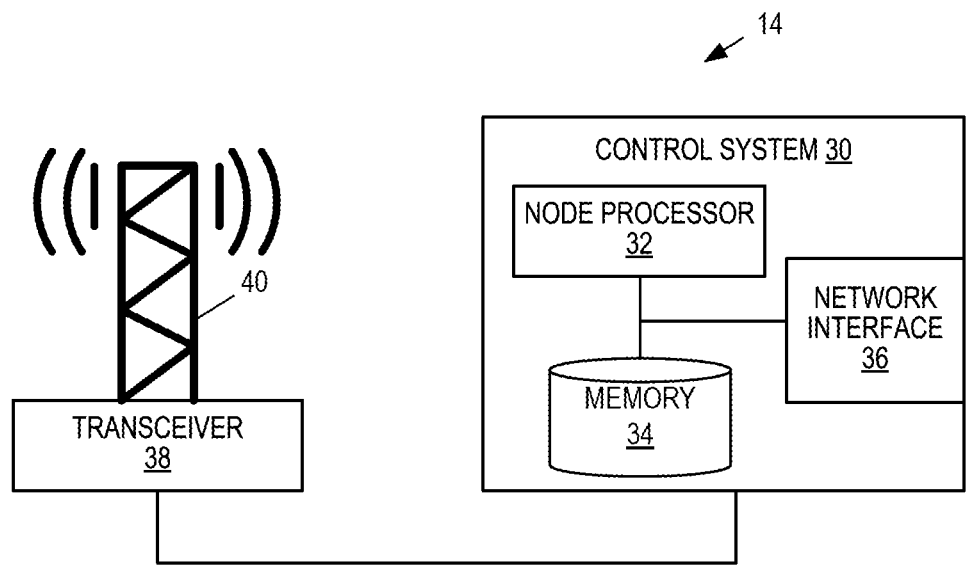
FIGS. 17 through 19 are block diagrams of some embodiments of a radio access node.

Referring to FIG. 17, a radio access node 14 comprises a node processor 32 (e.g., a CPU(s), ASIC(s), FPGA(s), and/or the like), a memory 34, a network interface 36, a transceiver 38, and an antenna 40. As illustrated, together, the processor 32, the memory 34, and the network interface 36 are referred to as a control system 30. In certain embodiments, some or all of the functionality described as being provided by a base station, a node B, an eNB, and/or any other type of network node may be provided by the node processor 32 executing instructions stored on a computer readable medium, such as the memory 34 shown in FIG. 17. Alternative embodiments of the radio access node 14 may comprise additional components to provide additional functionality, such as the functionality described herein and/or related supporting functionality.

Figure 18:
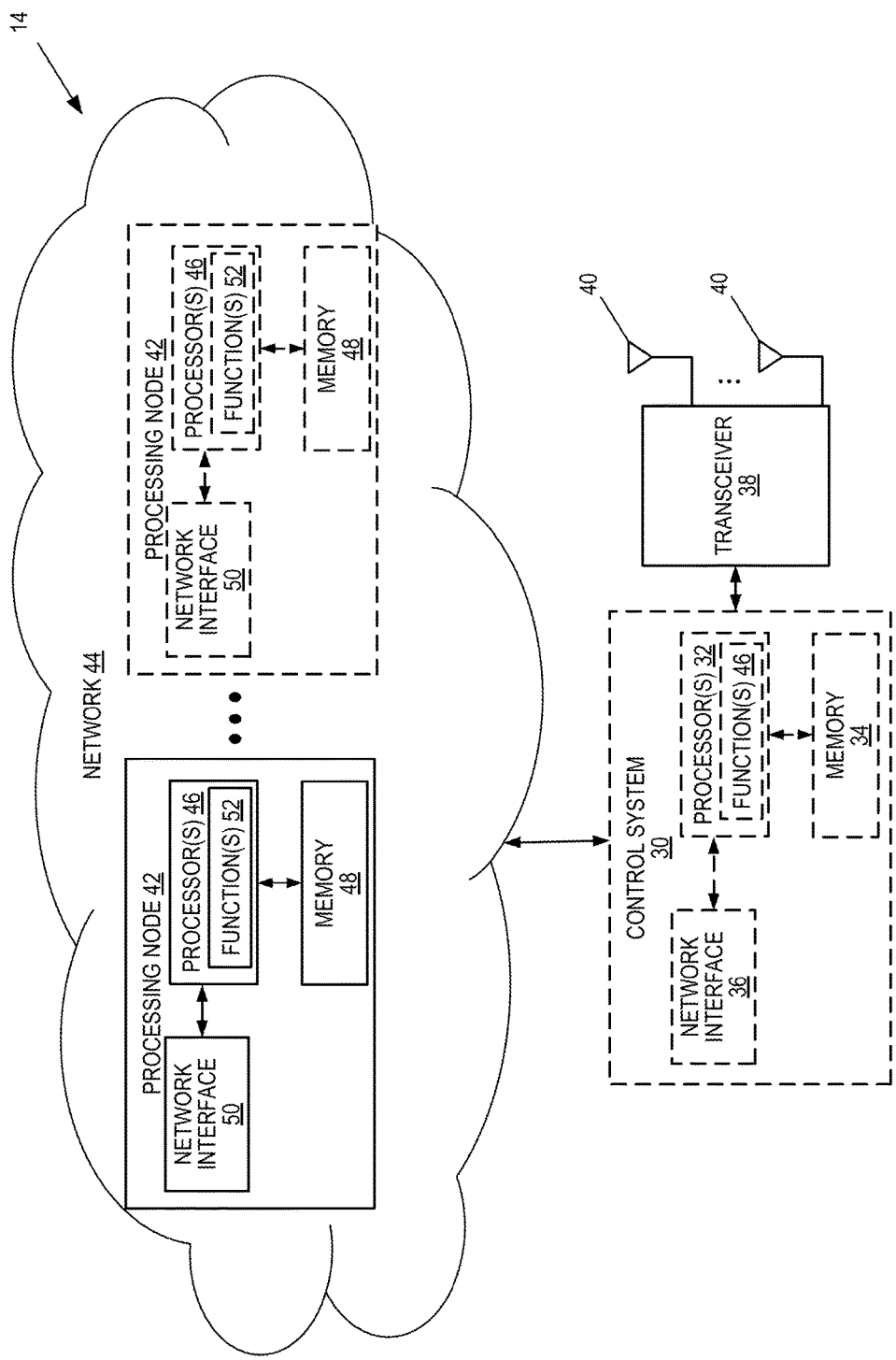

FIG. 18 is a schematic block diagram that illustrates a virtualized embodiment of the radio access node 14 according to some embodiments of the present disclosure. This discussion is equally applicable to other types of network nodes. Further, other types of network nodes may have similar virtualized architectures.

As used herein, a "virtualized" radio access node 14 is an implementation of the radio access node 14 in which at least a portion of the functionality of the radio access node 14 is implemented as a virtual component(s) (e.g., via a virtual machine(s) executing on a physical processing node(s) in a network(s)). As illustrated, in this example, the radio access node 14 includes the control system 30 that includes the processor(s) 32 (e.g., CPUs, ASICs, FPGAs, and/or the like), the memory 34, and the network interface 36. The radio access node 14 also includes the transceiver 38 coupled to the antenna(s) 40. The control system 30 is connected to the transceiver 38 via, for example, an optical cable or the like. Alternatively, the control system 30, the transceiver 38, and the antennas 40 may, e.g., be integrated into a single unit. The control system 30 is connected to one or more processing nodes 42 coupled to or included as part of a network(s) 44 via the network interface 36. Each processing node 42 includes one or more processors 46 (e.g., CPUs, ASICs, FPGAs, and/or the like), memory 48, and a network interface 50.

In this example, functions 52 of the radio access node 14 (e.g., functions of the eNB or base station) described herein are implemented at the one or more processing nodes 42 or distributed across the control system 30 and the one or more processing nodes 42 in any desired manner. In some particular embodiments, some or all of the functions 52 of the radio access node 14 described herein are implemented as virtual components executed by one or more virtual machines implemented in a virtual environment(s) hosted by the processing node(s) 42. As will be appreciated by one of ordinary skill in the art, additional signaling or communication between the processing node(s) 42 and the control system 30 is used in order to carry out at least some of the desired functions 52. Notably, in some embodiments, the control system 30 may not be included, in which case the transceiver 38 communicates directly with the processing node(s) 42 via an appropriate network interface(s).

Figure 19:
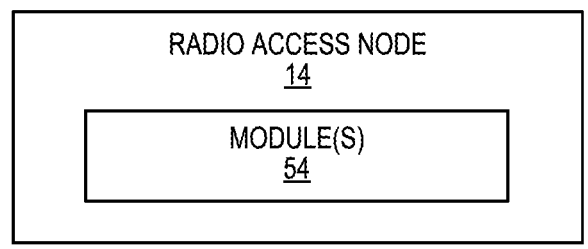

FIG. 19 illustrates the radio access node 14 according to some other embodiments of the present disclosure. As illustrated, the radio access node 14 includes one or more modules 54, each of which is implemented in software. The module(s) 54 operate to perform the functions of the radio access node 14 (e.g., eNB or base station) described herein. For example, the module(s) 54 may include a sending module operable to transmit a DMTC configuration as described herein.

The following acronyms are used throughout this disclosure.

μs Microsecond
3GPP Third Generation Partnership Project
AP Access Point
ASIC Application Specific Integrated Circuit
CA Carrier Aggregation
CC Component Carrier
CCA Clear Channel Assessment
CFI Control Format Indicator
CIF Carrier Indicator Field
CPU Central Processing Unit
CRS Cell-Specific Reference Symbol
CSI-RS Channel State Information Reference Signal
CSMA/CA Carrier Sense Multiple Access with Collision Avoidance
DCI Downlink Control Information
DFT Discrete Fourier Transform
DMTC Discovery Signal Measurement Timing Configuration
DRS Discovery Reference Signal
DwPTS Downlink Part of the Special Subframe
eNB Enhanced or Evolved Node B
ePDCCH Enhanced Physical Downlink Control Channel
eSIB Enhanced System Information Block
E-UTRA Evolved Universal Terrestrial Radio Access
FDD Frequency Division Duplexing
FDMA Frequency Division Multiple Access
FPGA Field Programmable Gate Array
GHz Gigahertz
HARQ Hybrid Automatic Repeat Request
ID Identity IE Information Element
LA License Assisted
LAA License Assisted Access
LBT Listen-Before-Talk
LTE Long Term Evolution
LTE-U Long Term Evolution in the Unlicensed Band
M2M Machine-to-Machine
MAC Medium Access Control
MHz Megahertz
ms Millisecond
MTC Machine Type Communication
NAS Non-Access Stratum
OFDM Orthogonal Frequency Division Multiplexing
PCell Primary Cell
PCFICH Physical Control Format Indicator Channel
PCID Physical Cell Identity
PDCCH Physical Downlink Control Channel
PDSCH Physical Downlink Shared Channel
PSS Primary Synchronization Signal
PUCCH Physical Uplink Control Channel
PUSCH Physical Uplink Shared Channel
RAT Radio Access Technology
Rel Release
RRC Radio Resource Control
RRM Radio Resource Management
RSRP Reference Signal Received Power
RSRQ Reference Signal Received Quality
RSSI Received Signal Strength Indicator
SCell Secondary Cell
SC-FDMA Single Carrier Frequency Division Multiple Access
SFN System Frame Number
SIB System Information Block
SIB-MF MulteFire System Information Block
SSS Secondary Synchronization Signal
TDD Time Division Duplexing
TS Technical Specification
UE User Equipment
VCID Virtual Cell Identity
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a radio access node in a cellular communications network, comprising:
    sending, to a wireless device, one or more Discovery Signal Measurement Timing Configurations, DMTCs, for a frequency on which one or more asynchronous cells can be operating, an asynchronous cell being a cell that is unsynchronized with a primary cell of the wireless device;
    wherein sending the one or more DMTCs comprises transmitting system information or a measurement object comprising:
        an indication of whether one or more asynchronous cells are operating on the frequency;
        if the indication is set to a value that indicates that one or more asynchronous cells are operating on the frequency, a first DMTC for the frequency to be used by the wireless device for one or more asynchronous cells operating on the frequency; and
        if the indication is set to a value that indicates that there are no asynchronous cells operating on the frequency, a second DMTC for the frequency to be used by the wireless device for one or more synchronous cells operating on the frequency.

2. The method of claim 1 wherein transmitting the system information or the measurement object comprises transmitting the system information comprising:
    the indication of whether one or more asynchronous cells are operating on the frequency, wherein the one or more asynchronous cells are one or more intra-frequency asynchronous cells;
    if the indication is set to a value that indicates that one or more asynchronous cells are operating on the frequency, the first DMTC for the frequency to be used by the wireless device for one or more intra-frequency asynchronous cells operating on the frequency; and
    if the indication is set to a value that indicates that there are no asynchronous cells operating on the frequency, the second DMTC for the frequency to be used by the wireless device for one or more intra-frequency synchronous cells operating on the frequency.

3. The method of claim 2 wherein each of the first DMTC and the second DMTC comprises at least one of a DMTC periodicity, a DMTC offset, and a DMTC duration.

4. The method of claim 2 wherein the system information is a System Information Block type 3, SIB3, information element.

5. The method of claim 1 wherein transmitting the system information or the measurement object comprises transmitting the system information comprising:
    the indication of whether one or more asynchronous cells are operating on the frequency, wherein the one or more asynchronous cells are one or more inter-frequency asynchronous cells;
    if the indication is set to a value that indicates that one or more asynchronous cells are operating on the frequency, the first DMTC for the frequency to be used by the wireless device for one or more inter-frequency asynchronous cells operating on the frequency; and
    if the indication is set to a value that indicates that there are no asynchronous cells operating on the frequency, the second DMTC for the frequency to be used by the wireless device for one or more inter-frequency synchronous cells operating on the frequency.

6. The method of claim 1 wherein transmitting the system information or the measurement object comprises transmitting the measurement object to the wireless device, the measurement object comprising:
    the indication of whether one or more asynchronous cells are operating on the frequency;
    if the indication is set to a value that indicates that one or more asynchronous cells are operating on the frequency, the first DMTC for the frequency to be used by the wireless device for one or more asynchronous cells operating on the frequency; and
    if the indication is set to a value that indicates that there are no asynchronous cells operating on the frequency, the second DMTC for the frequency to be used by the wireless device for one or more synchronous cells operating on the frequency.

7. The method of claim 1 wherein sending the one or more DMTCs comprises sending both the first DMTC and the second DMTC.

8. The method of claim 7 wherein the system information or the measurement object further comprises a second indication of whether any synchronous cells are operating on the frequency.

9. A radio access node for a cellular communications network, comprising:
- a processor; and
- memory comprising instructions executable by the processor whereby the radio access node is operable to:
  - send, to a wireless device, one or more Discovery Signal Measurement Timing Configurations, DMTCs, for a frequency on which one or more asynchronous cells can be operating, an asynchronous cell being a cell that is unsynchronized with a primary cell of the wireless device;
- wherein, in order to send the one or more DMTCs, the radio access node is operable to transmit system information or a measurement object comprising:
  - an indication of whether one or more asynchronous cells are operating on the frequency;
  - if the indication is set to a value that indicates that one or more asynchronous cells are operating on the frequency, a first DMTC for the frequency to be used by the wireless device for one or more asynchronous cells operating on the frequency; and
  - if the indication is set to a value that indicates that there are no asynchronous cells operating on the frequency, a second DMTC for the frequency to be used by the wireless device for one or more synchronous cells operating on the frequency.

10. A method of operation of a wireless device in a cellular communications network, comprising:
- receiving one or more Discovery Signal Measurement Timing Configurations, DMTCs, for a frequency on which one or more asynchronous cells can be operating, the one or more asynchronous cells being one or more cells that are unsynchronized with a primary cell of the wireless device, wherein receiving the one or more DMTCs comprises receiving system information or a measurement object comprising:
  - an indication of whether one or more asynchronous cells are operating on the frequency;
  - if the indication is set to a value that indicates that one or more asynchronous cells are operating on the frequency, a first DMTC for the frequency to be used by the wireless device for one or more asynchronous cells operating on the frequency; and
  - if the indication is set to a value that indicates that there are no asynchronous cells operating on the frequency, a second DMTC for the frequency to be used by the wireless device for one or more synchronous cells operating on the frequency; and
- utilizing the one or more DMTCs.

11. The method of claim 10 wherein receiving the system information or the measurement object comprises receiving the system information comprising:
- the indication of whether one or more asynchronous cells are operating on the frequency, wherein the one or more asynchronous cells are one or more intra-frequency asynchronous cells;
- if the indication is set to a value that indicates that one or more asynchronous cells are operating on the frequency, the first DMTC for the frequency to be used by the wireless device for one or more intra-frequency asynchronous cells operating on the frequency; and
- if the indication is set to a value that indicates that there are no asynchronous cells operating on the frequency, the second DMTC for the frequency to be used by the wireless device for one or more intra-frequency synchronous cells operating on the frequency.

12. The method of claim 11 wherein the system information is a System Information Block type 3 (SIB3) information element.

13. The method of claim 10 wherein receiving the system information or the measurement object comprises receiving the system information comprising:
- the indication of whether one or more asynchronous cells are operating on the frequency, wherein the one or more asynchronous cells are one or more inter-frequency asynchronous cells;
- if the indication is set to a value that indicates that one or more asynchronous cells are operating on the frequency, the first DMTC for the frequency to be used by the wireless device for one or more inter-frequency asynchronous cells operating on the frequency; and
- if the indication is set to a value that indicates that there are no asynchronous cells operating on the frequency, the second DMTC for the frequency to be used by the wireless device for one or more inter-frequency synchronous cells operating on the frequency.

14. The method of claim 13 wherein the system information is a System Information Block type 5 (SIB5) information element.

15. The method of claim 10 wherein receiving the system information or the measurement object comprises receiving the measurement object, the measurement object comprising:
- the indication of whether one or more asynchronous cells are operating on the frequency;
- if the indication is set to a value that indicates that one or more asynchronous cells are operating on the frequency, the first DMTC for the frequency to be used by the wireless device for one or more asynchronous cells operating on the frequency; and
- if the indication is set to a value that indicates that there are no asynchronous cells operating on the frequency, the second DMTC for the frequency to be used by the wireless device for one or more synchronous cells operating on the frequency.

16. The method of claim 10 wherein receiving the one or more DMTCs comprises receiving both the first DMTC and the second DMTC.

17. The method of claim 10 wherein the system information or the measurement object further comprises a second indication of whether any synchronous cells are operating on the frequency.

18. A wireless device for a cellular communications network, comprising:
- a transceiver;
- a processor; and
- memory comprising instructions executable by the processor whereby the wireless device is operable to:
  - receive one or more Discovery Signal Measurement Timing Configurations, DMTCs, for a frequency on which one or more asynchronous cells can be operating, the one or more asynchronous cells being one or more cells that are unsynchronized with a primary cell of the wireless device wherein, in order to receive the one or more DMTCs, the wireless device is operable to receive system information or a measurement object comprising:
    - an indication of whether one or more asynchronous cells are operating on the frequency;
    - if the indication is set to a value that indicates that one or more asynchronous cells are operating on the frequency, a first DMTC for the frequency to be used by the wireless device for one or more asynchronous cells operating on the frequency; and if the indication is set to a value that indicates that there are no asynchronous cells operating on the frequency, a second DMTC for the frequency to be used by the wireless device for one or more synchronous cells operating on the frequency; and utilize the one or more DMTCs.

* * * * *